(12) United States Patent
Hofmann et al.

(10) Patent No.: US 10,914,866 B1
(45) Date of Patent: Feb. 9, 2021

(54) METHODS AND MATERIALS FOR METAMATERIALS EXHIBITING FORM-INDUCED BIREFRINGENCE

(71) Applicants: University of North Carolina Charlotte, Charlotte, NC (US); J.A. Woollam Co. Inc., Lincoln, NE (US); Harris Corporation GCS, Palm Bay, FL (US)

(72) Inventors: Tino Hofmann, Harrisburg, NC (US); Daniel Fullager, Charlotte, NC (US); Stefan Schoeche, Lincoln, NE (US); Craig M. Herzinger, Lincoln, NE (US); Susanne Madeline Lee, Cocoa, FL (US); Erin Kathleen Sharma, Palm Bay, FL (US)

(73) Assignees: HARRIS CORPORATION GCS, Palm Bay, FL (US); UNIVERSITY OF NORTH CAROLINA CHARLOTTE, Charlotte, NC (US); J.A. WOOLLAM CO. INC., Lincoln, NE (US)

( * ) Notice: Subject to any disclaimer, the term of this patent is extended or adjusted under 35 U.S.C. 154(b) by 0 days.

(21) Appl. No.: 16/038,004

(22) Filed: Jul. 17, 2018

Related U.S. Application Data

(60) Provisional application No. 62/533,472, filed on Jul. 17, 2017.

(51) Int. Cl.
*B29C 64/135* (2017.01)
*B33Y 10/00* (2015.01)
(Continued)

(52) U.S. Cl.
CPC .............. *G02B 1/04* (2013.01); *B29C 64/135* (2017.08); *B33Y 80/00* (2014.12); *G02B 1/002* (2013.01);
(Continued)

(58) Field of Classification Search
CPC .......... G02B 1/04; G02B 1/002; B33Y 80/00; B33Y 10/00; B33Y 70/00; B29C 64/135;
(Continued)

(56) References Cited

U.S. PATENT DOCUMENTS 9,007,688 B2* 4/2015 Vasylyev ........... G02B 19/0042
359/595
2016/0025288 A1* 1/2016 Vasylyev .................. F21V 3/06
359/595

OTHER PUBLICATIONS

Shelby et al., Experimental Veri Veribcation cation of a Negative Index of RefractionScience 292, 77 (2001).
(Continued)

*Primary Examiner* — David Sample
*Assistant Examiner* — Donald M Flores, Jr.
(74) *Attorney, Agent, or Firm* — Thomas | Horstemeyer, LLP

(57) ABSTRACT

Materials comprising metamaterials exhibiting form-induced birefringence and anisotropic optical properties are provided. The disclosed articles comprise structures with critical dimensions which are on the order of or smaller than the wavelength for the gigahertz and terahertz spectral range. Methods of preparing same using stereolithography are disclosed. In a further aspect, the disclosed methods pertain to spectroscopic ellipsometry methods comprising a biaxial (orthorhombic) layer homogenization approach is to analyze the terahertz ellipsometric data obtained at three different sample azimuth orientations. The disclosed articles and methods demonstrate provide an avenue to fabricate metamaterials for the terahertz spectral range and allows tailoring of the polarizability and anisotropy of the host material. This abstract is intended as a scanning tool for purposes of searching in the particular art and is not intended to be limiting of the present invention.

18 Claims, 11 Drawing Sheets

(51) Int. Cl.
  *B33Y 70/00* (2020.01)
  *B33Y 80/00* (2015.01)
  *G02B 1/00* (2006.01)
  *G02B 1/04* (2006.01)
  *B29L 11/00* (2006.01)
  *B29K 33/00* (2006.01)

(52) U.S. Cl.
  CPC ...... *B29K 2033/08* (2013.01); *B29K 2033/12* (2013.01); *B29K 2995/0032* (2013.01); *B29L 2011/00* (2013.01); *B33Y 10/00* (2014.12); *B33Y 70/00* (2014.12); *Y10T 428/26* (2015.01)

(58) Field of Classification Search
  CPC ........ B29K 2995/0032; B29K 2033/08; B29K 2033/12; B29L 2011/00; Y10T 428/26
  USPC .................................................. 428/141–155
  See application file for complete search history.

(56) References Cited

OTHER PUBLICATIONS

Pendry et al., Phys., Reversing Light: Negative Refraction, Today 57, 37 (2004).
Mao et al., The Emerging Frontiers and Applications of High-Resolution 3D Printing, Micromachines 8, 113 (2017).
Kawata et al., Finer features for functional microdevices, Nature 412, 697 (2001).
Farsari et al., Two-photon Fabrication, Nat. Photonics 3, 450 (2009).
Zheng et al., Design and optimization of a light-emitting diode projection micro-stereolithography three-dimensional manufacturing systemSpadaccini, Rev. Sci. Instrum. 83, 125001 (2012).
Boltasseva et al., Fabrication of optical negative-index metamaterials: Recent advances and outlook, Metamaterials 2, 1 (2008).
Thiel et al., Dip-in depletion optical lithography of three-dimensional chiral polarizers, Opt. Lett. 38, 4252 (2013).
Otter et al., Hybrid 3-D-Printing Technology for Tunable THz Applications, Proc. IEEE 105, 756 (2017).
Zhang et al., Investigation on 3-D-Printing Technologies for Millimeter-Wave and Terahertz Applications, Proc. IEEE 105, 723 (2017).
Hofmann et al., Variable-wavelength frequency-domain terahertz ellipsometry, Rev. Sci. Instrum. 81, 023101 (2010).
Hofmann et al., THz dielectric anisotropy of metal slanted columnar thin films, Appl. Phys. Lett. 99, 081903 (2011).
Kühne et al., Invited Article: An integrated mid-infrared, far-infrared, and terahertz optical Hall effect Instrument, Rev. Sci. Instrum. 85, 071301 (2014).
Hofmann et al., Screening effects in metal sculptured thin films studied with terahertz Mueller matrix ellipsometry, Applied Surface Science 421, 513-517 (2017).
Fujiwara, Spectroscopic Ellipsometry (John Wiley & Sons, New York, 2007).
Hauge, Recent Developments in Instrumentation in Ellipsometry, Surf. Sci. 96, 108 (1980).
Jellison et al., Spectroscopic ellipsometry data analysis: measured versus calculated quantities, Thin Solid Films 313-314, 33 (1998).
Naftaly et al., Terahertz Time-Domain Spectroscopy for Material Characterization, Proc. IEEE 95, 1658 (2007).
Schmidt et al., Generalized ellipsometry for monoclinic absorbing materials: determination of optical constants of Cr columnar thin filmsOpt. Lett. 34, 992 (2009).

* cited by examiner

METHODS AND MATERIALS FOR METAMATERIALS EXHIBITING FORM-INDUCED BIREFRINGENCE

CROSS-REFERENCE TO RELATED APPLICATIONS

This Application claims the benefit of U.S. Provisional Application No. 62/533,472, filed on Jul. 17, 2017, which is incorporated herein by reference in its entirety.

STATEMENT REGARDING FEDERALLY SPONSORED RESEARCH OR DEVELOPMENT

This invention was made with U.S. Government support under grant number 1068050, awarded by the National Science Foundation. The U.S. government has certain rights in the invention.

BACKGROUND

Metamaterials have attracted continued interest for almost two decades due to their unique electromagnetic properties, which can differ substantially from their constituents and often do not even exist in naturally occurring materials (R. A. Shelby, D. R. Smith, and S. Schultz, Science 292, 77 (2001); and J. B. Pendry and D. R. Smith, Phys. Today 57, 37 (2004)). Commonly, lithographic fabrication approaches (e.g. optical, electron-beam, femtosecond laser, or nanoimprint lithography) are employed for the syntheses of metamaterials which are composed of building blocks with subwavelength feature sizes (M. Mao, J. He, X. Li, B. Zhang, Q. Lei, Y. Liu, and D. Li, Micromachines 8, 113 (2017)). Lithographic techniques, however, typically require expensive equipment, complicated processing steps, long production period and only allow the fabrication of two-dimensional (2D) or 2.5D structures on a flat surface, which fundamentally limits the classes of metamaterials which can be fabricated with these approaches (M. Mao, J. He, X. Li, B. Zhang, Q. Lei, Y. Liu, and D. Li, Micromachines 8, 113 (2017)).

More recently two-photon polymerization and microstereolithography have been used to fabricate complex three-dimensional (3D) architectures with micro and nanoscale resolutions, respectively (S. Kawata, H.-B. Sun, T. Tanaka, and K. Takada, Nature 412, 697 (2001); M. Farsari and B. N. Chichkov, Nat. Photonics 3, 450 (2009); and X. Zheng, J. Deotte, M. P. Alonso, G. R. Farquar, T. H. Weisgraber, S. Gemberling, H. Lee, N. Fang, and C. M. Spadaccini, Rev. Sci. Instrum. 83, 125001 (2012)). These layer-by-layer additive fabrication techniques are ideally suited for the synthesis of metamaterials with virtually arbitrary 3D architectures designed to operate in the infrared and visible spectral range (A. Boltasseva and V. M. Shalaev, Metamaterials 2, 1 (2008); and M. Thiel, J. Ott, A. Radke, J. Kaschke, and M. Wegener, Opt. Lett. 38, 4252 (2013)). Although, stereolithography has been used to fabricate waveguide components, phase shifters, and band pass filters for the spectral range from 10 GHz to 1 THz (W. J. Otter and S. Lucyszyn, Proc. IEEE 105, 756 (2017); and B. Zhang, Y.-X. Guo, H. Zirath, and Y. P. Zhang, Proc. IEEE 105, 723 (2017)), thus far it has not been amenable to the manufacture of metamaterials with pre-designed anisotropic or other optical properties.

Despite interest materials exhibiting optical anisotropy at gigahertz and/or terahertz frequencies methods which do not depend upon wave guides have been lacking, as have methods for the rapid manufacture of same. In particular, metamaterials which exhibit optical anisotropy or form-induced birefringence at gigahertz and/or terahertz frequencies have not been available. and approaches for accurate experimental measurement and analysis of the anisotropic optical properties have not been reported so far. These needs and others are addressed in the present disclosure.

SUMMARY

In accordance with the purpose(s) of the present disclosure, as embodied and broadly described herein, the disclosure, in one aspect, relates to the design, fabrication, and use of 3D metamaterials which exhibit form-induced birefringence and are composed of structures with critical dimensions which are on the order of or smaller than the wavelength for the GHz and THz spectral range. In a further aspect, the disclosure pertains to ensembles of micrometer-sized structures composed of dielectric materials exhibit a strong optical anisotropy in the GHz and THz spectral range.

In an aspect, the disclosed metamaterials exhibit optical anisotropy provided by coupling between spatially coherent arrangements of millimeter, micrometer, or sub-micrometer-sized structures and depends on the geometry, spacing, spatial order and material of the constituents. In a further aspect, the dielectric properties of the constituents may be either optically isotropic or anisotropic in nature.

In an aspect, the metamaterial comprises an acrylate polymer. In a still further aspect, the metamaterial comprises spatially coherent structures. In a yet further aspect, the spatially coherent structures are arranged upon a support substrate. In a further aspect, the spatially coherent structures are arranged at an angle relative to the support substrate.

In an aspect, the spatially coherent dielectric structures disclosed herein exhibit optically anisotropic properties in the gigahertz and terahertz spectral range while the bulk properties of the dielectric constituents can be isotropic.

In an aspect, the present disclosure pertains to methods of making the disclosed metamaterials. In a further aspect, the method comprises a maskless photolithographic technique. In a still further aspect, the maskless photolithographic technique is stereolithography or 3D two photon lithography. In a still further aspect, the stereolithography comprises providing an acrylate polymer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
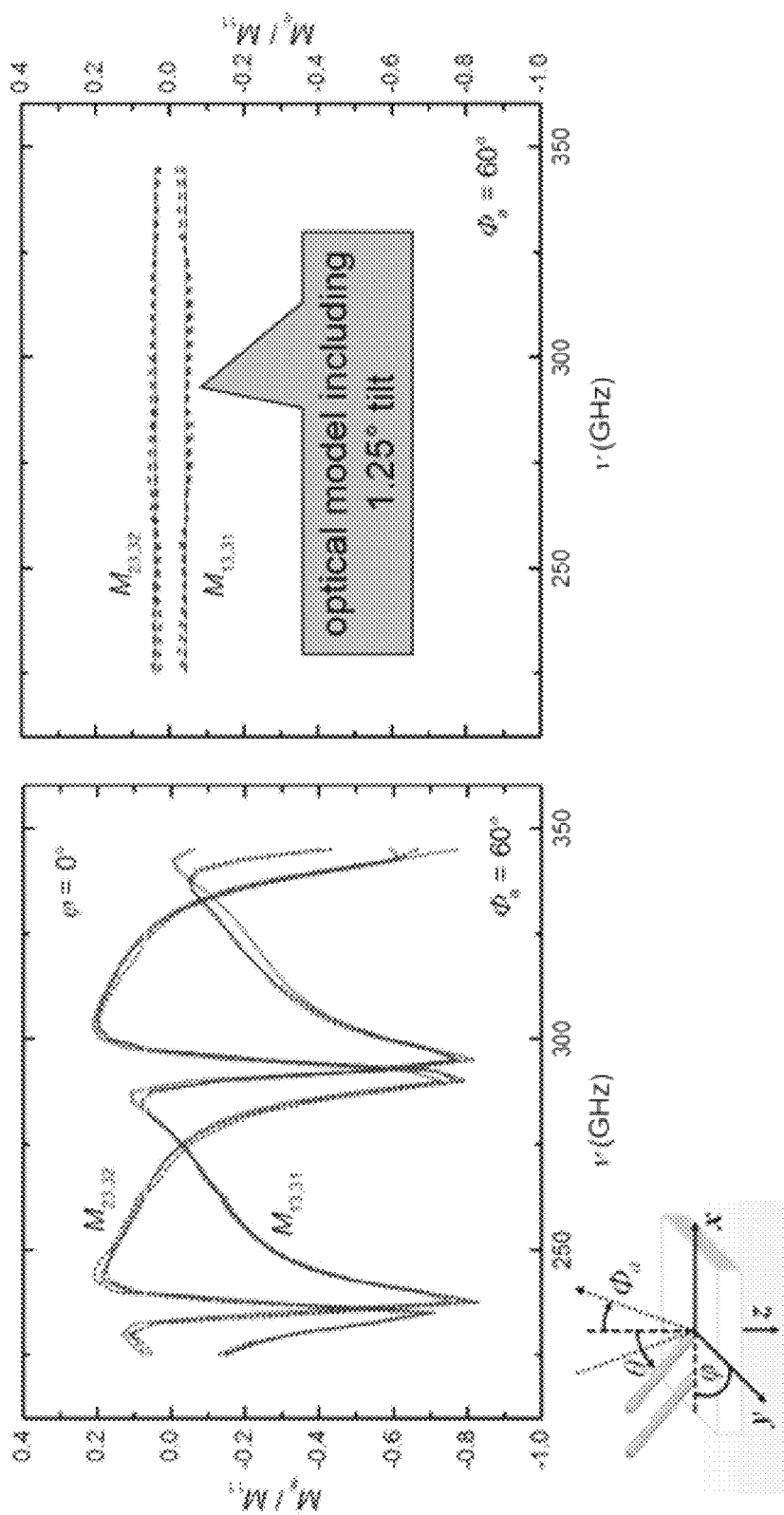
FIG. 1 shows representative data of form-induced birefringence effects in a representative material comprising slanted wires with a diameter of 200 µm, a length of approximately 1400 µm, and a slanting angle of 45°.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The disclosures herein will be described more fully hereinafter with reference to the accompanying drawings, in which some, but not all possible embodiments are shown. Indeed, disclosures may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Prior to describing the various embodiments, the following definitions are provided and should be used unless otherwise indicated.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a structure," "a polyacrylate polymer," or "a substrate," including, but not limited to, any of two or more such structures, polyacrylate polymers, or substrates, and the like.

Reference to "a" chemical compound or polymer refers one or more molecules of the chemical compound or polymer, rather than being limited to a single molecule of the chemical compound. Furthermore, the one or more molecules may or may not be identical, so long as they fall under the category of the chemical compound. Thus, for example, "a" polyacrylate is interpreted to include one or more polymer molecules of the polyacrylate, where the polymer molecules may or may not be identical (e.g., different molecular weights and/or isomers).

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a polymer refers to an amount that is sufficient to achieve the desired improvement in the property modulated by the formulation component, e.g., achieving the desired level of optical or birefringence properties. The specific level in terms of wt % in a composition required as an effective amount will depend upon a variety of factors including the amount and type of polyacrylate, amount and type of fillers, amount and type of second polymers, and end use of the article made using the composition.

As used herein, the term "effective angle" refers to an angle that is sufficient to achieve the desired modification of a physical property of the composition or material, e.g., dielectric optical anisotropy in the gigahertz and/or terahertz frequency range or form-induced birefringence. For example, an "effective angle" of a structure refers to an angle that is sufficient to achieve the desired improvement in the property modulated by the structure, e.g., dielectric optical anisotropy in the gigahertz and/or terahertz frequency range or form-induced birefringence. The specific level in terms of angle relative to an axis of the material required as an effective angle will depend upon a variety of factors including the amount and type of polymer, desired response frequency, geometry of the structure, and packing arrangement of the individual structures within the plurality of structures.

As used herein, the terms "optional" or "optionally" means that the subsequently described event or circumstance can or cannot occur, and that the description includes instances where said event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Unless otherwise specified, temperatures referred to herein are based on atmospheric pressure (i.e. one atmosphere).

Disclosed are the components to be used to prepare the articles of the invention as well as the materials to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

In an aspect, the present disclosure pertains to the design, fabrication, and use of 3D metamaterials which exhibit form-induced birefringence and are composed of structures with critical dimensions which are on the order of or smaller than the wavelength for the gigahertz (GHz) and terahertz (THz) spectral frequency range.

In an aspect, the present disclosure pertains to an article comprising a plurality of micrometer-sized individual structures composed of dielectric materials, assembled with a spacing and geometry such that the article exhibits a strong optical anisotropy in the gigahertz and terahertz spectral range. Without wishing to be bound by a particular theory, the optical anisotropy is believed to be caused by coupling between spatially coherent arrangements of millimeter, micrometer, or sub-micrometer-sized structures, also referred to herein as individual structures. The optical anisotropy of the article depends, at least in part, on the geometry, spacing, spatial order and material of the individual structures. In other words, one can modify the optical anisotropy of the article by changing the geometry, spacing, spatial order, and/or material of the individual structures. The dielectric properties of each of the individual structures may be either optically isotropic or anisotropic in nature. Data are provided herein below verifying that a disclosed 3D metamaterial comprising 3D slanted wire structures comprising from methacrylate is associated with the desired optical properties. Moreover, the data provided herein below demonstrate that form-induced birefringence can be accurately measured and characterized using generalized ellipsometry in the gigahertz and terahertz spectral range.

In an aspect, the present disclosure pertains to 3D metamaterials comprising spatially coherent dielectric structures exhibiting optically anisotropic properties in the gigahertz and terahertz spectral range while the bulk properties of the dielectric constituents can be isotropic. Without wishing to be bound by a particular theory, it is believed that the origin of the birefringence derives from the interaction between the subwavelength structures arranged in a spatially coherent fashion and an electromagnetic wave. Further, without wishing to be bound by a particular theory, it is believed that slanted wires for which the bases are arranged in a square unit-cell the optical response is found to be biaxial as demonstrated in the data described herein below.

Figure 11:
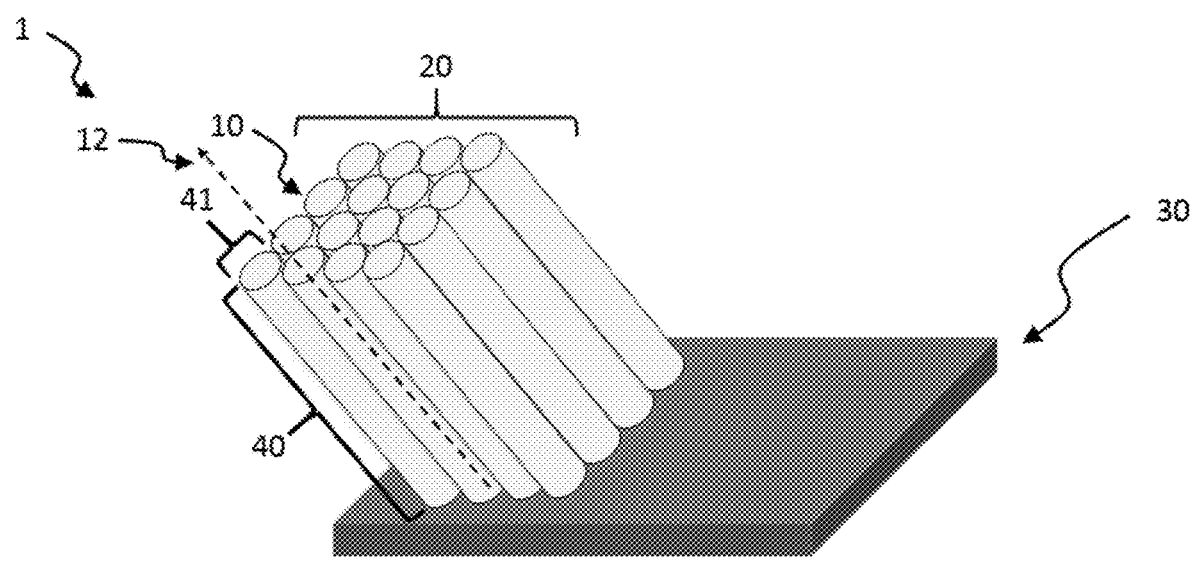
FIG. 11 shows an aspect of a schematic of disclosed article 1 comprising a plurality of structures 20 comprising individual structures 10 that may extend generally in a first direction 12, wherein the plurality of structures are arranged on a substrate 30. Each individual structure can be characterized by a length dimension 40 and a cross-sectional geometry dimension 41.
Figure 12:
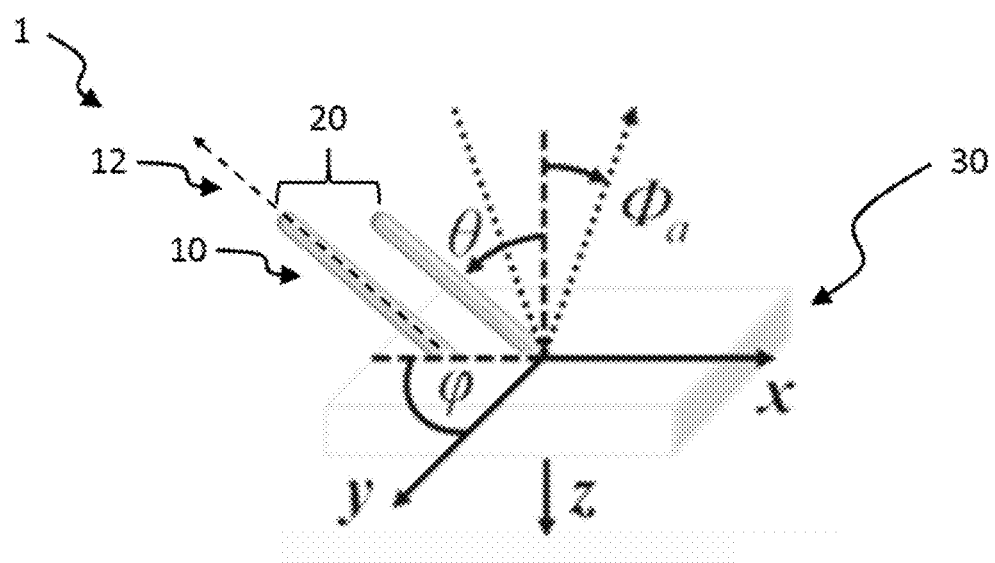
FIG. 12 shows angular relationships among elements of a disclosed article 1 comprising a plurality of structures 20 comprising individual structures 10, wherein the plurality of structures are arranged on a substrate 30. In the figure, angle θ is an angle describing the angular relationship of an individual structural element from the z-axis (a first slanting angle). Angles $\varphi$ and $\phi_a$ is describe the sample azimuth and angle of incidence for the spectroscopic ellipsometry measurement. A second slanting angle can be used to describe the angle an individual structural element from the y-axis.

Referring to FIGS. 11 and 12, in an aspect, the disclosed article 1, a 3D metamaterial, comprises a plurality of structures 20 comprising individual structures 10, each individual structure 10 may extend generally in a first direction 12. The plurality of structures may be arranged on an optional substrate 30. In a further aspect, the substrate 30 is present in the disclosed article. In a further aspect, the substrate 30 is not present in the disclosed article. The plurality of structures 20 can be arranged in a certain spatial and packing arrangement to one another, as described further herein. In a still further aspect, the plurality of structures 20 may be arranged such that one or more adjacent individual structures 10 touch one another as shown in FIGS. 11 and 12. Each individual structure 10 can be characterized by a length dimension 40 and a cross-sectional geometry dimension 41. That is, the length dimension is a dimension extending from an edge in contact with the optional substrate 30 along the first direction 12 to the opposing end of the individual structure 10. The cross-sectional geometry dimension 41 is the cross-sectional geometry dimension of an individual structure 10. As shown in FIG. 11, the cross-sectional geometry is circular, and accordingly the longest cross-sectional geometry dimension is the diameter thereof. Alternatively, the cross-sectional geometry could be an ellipse, and in such an instance, the cross-sectional geometry dimension would be a length of a major axis of such an ellipse shape. Further aspects of the cross-sectional geometry are disclosed herein below.

In various aspects, the substrate 30 can have a variety of configurations provided that: (a) the substrate 30 is in communication or contact with the plurality of structures 20 and fixes them in a desired arrangement to one another; and (b) the support structure 30 is not of a symmetry which, in combination with the plurality of structures 20, results in an isotropic arrangement of components. For example, the substrate 30 can be formed from a continuous sheet of material essentially solid in geometry. Alternatively, the substrate 30 can be a mesh-like structure in which the strands or wires of the mesh structure are in communication or contact with the plurality of structures 20 and thereby fixing them in a desired arrangement to one another. As noted above, particularly if the substrate 30 is not a solid sheet, e.g., if a mesh with strands or wirings and an open mesh-like structure, it should be configured in a manner such that support structure is not of a symmetry which, in combination with the wires, results in an isotropic arrangement of components. That is, the substrate 30 in communication or contact with the plurality of structures 20 provides for optical anisotropy and not optical isotropy.

In various aspects, the individual structure 10 can be characterized by an aspect ratio that is a ratio of a length dimension 40 to a cross-sectional geometry dimension 41 such that the aspect ratio has a value of about 0.1:1 to about 3000:1; about 0.2:1 to about 3000:1; about 0.3:1 to about 3000:1; about 0.4:1 to about 3000:1; about 0.5:1 to about 3000:1; about 0.6:1 to about 3000:1; about 0.7:1 to about 3000:1; about 0.8:1 to about 3000:1; about 0.9:1 to about 3000:1; about 1:1 to about 3000:1; 1.1:1 to about 3000:1; about 1.2:1 to about 3000:1; about 1.3:1 to about 3000:1; about 1.4:1 to about 3000:1; about 1.5:1 to about 3000:1; about 1.6:1 to about 3000:1; about 1.7:1 to about 3000:1; about 1.8:1 to about 3000:1; about 1.9:1 to about 3000:1; about 2:1 to about 3000:1; about 3:1 to about 3000:1; about 4:1 to about 3000:1; about 5:1 to about 3000:1; about 6:1 to about 3000:1; about 7:1 to about 3000:1; about 8:1 to about 3000:1; about 9:1 to about 3000:1; about 10:1 to about 3000:1; about 100:1 to about 3000:1; about 200:1 to about 3000:1; about 300:1 to about 3000:1; about 400:1 to about 3000:1; about 500:1 to about 3000:1; about 600:1 to about 3000:1; about 700:1 to about 3000:1; about 800:1 to about 3000:1; about 900:1 to about 3000:1; about 1000:1 to about 3000:1; about 1100:1 to about 3000:1; about 1200:1 to about 3000:1; about 1300:1 to about 3000:1; about 1400:1 to about 3000:1; about 1500:1 to about 3000:1; about 1600:1 to about 3000:1; about 1700:1 to about 3000:1; about 1800:1 to about 3000:1; about 1900:1 to about 3000:1; about 2000:1 to about 3000:1; about 2100:1 to about 3000:1; about 2200:1 to about 3000:1; about 2300:1 to about 3000:1; about 2400:1 to about 3000:1; about 2500:1 to about 3000:1; about 2600:1 to about 3000:1; about 2700:1 to about 3000:1; about 2800:1 to about 3000:1; about 2900:1 to about 3000:1; any value or combination of values within the foregoing ranges, or any sub-range within the foregoing ranges.

In a further aspect, the individual structure 10 can be characterized by an aspect ratio that is a ratio of a length dimension 40 to a cross-sectional geometry dimension 41 such that the aspect ratio has a value of about 0.1:1 to about 2000:1; about 0.2:1 to about 2000:1; about 0.3:1 to about 2000:1; about 0.4:1 to about 2000:1; about 0.5:1 to about 2000:1; about 0.6:1 to about 2000:1; about 0.7:1 to about 2000:1; about 0.8:1 to about 2000:1; about 0.9:1 to about 2000:1; about 1:1 to about 2000:1; 1.1:1 to about 2000:1; about 1.2:1 to about 2000:1; about 1.3:1 to about 2000:1; about 1.4:1 to about 2000:1; about 1.5:1 to about 2000:1; about 1.6:1 to about 2000:1; about 1.7:1 to about 2000:1; about 1.8:1 to about 2000:1; about 1.9:1 to about 2000:1; about 2:1 to about 2000:1; about 3:1 to about 2000:1; about 4:1 to about 2000:1; about 5:1 to about 2000:1; about 6:1 to about 2000:1; about 7:1 to about 2000:1; about 8:1 to about 2000:1; about 9:1 to about 2000:1; about 10:1 to about 2000:1; about 100:1 to about 2000:1; about 200:1 to about 2000:1; about 300:1 to about 2000:1; about 400:1 to about 2000:1; about 500:1 to about 2000:1; about 600:1 to about 2000:1; about 700:1 to about 2000:1; about 800:1 to about 2000:1; about 900:1 to about 2000:1; about 1000:1 to about 2000:1; about 1100:1 to about 2000:1; about 1200:1 to about 2000:1; about 1300:1 to about 2000:1; about 1400:1 to about 2000:1; about 1500:1 to about 2000:1; about 1600:1 to about 2000:1; about 1700:1 to about 2000:1; about 1800:1 to about 2000:1; about 1900:1 to about 2000:1; any value or combination of values within the foregoing ranges, or any sub-range within the foregoing ranges.

In a further aspect, the individual structure 10 can be characterized by an aspect ratio that is a ratio of a length dimension 40 to a cross-sectional geometry dimension 41 such that the aspect ratio has a value of about 0.1:1 to about 1000:1; about 0.2:1 to about 1000:1; about 0.3:1 to about 1000:1; about 0.4:1 to about 1000:1; about 0.5:1 to about 1000:1; about 0.6:1 to about 1000:1; about 0.7:1 to about 1000:1; about 0.8:1 to about 1000:1; about 0.9:1 to about 1000:1; about 1:1 to about 1000:1; 1.1:1 to about 1000:1; about 1.2:1 to about 1000:1; about 1.3:1 to about 1000:1; about 1.4:1 to about 1000:1; about 1.5:1 to about 1000:1; about 1.6:1 to about 1000:1; about 1.7:1 to about 1000:1; about 1.8:1 to about 1000:1; about 1.9:1 to about 1000:1; about 2:1 to about 1000:1; about 3:1 to about 1000:1; about 4:1 to about 1000:1; about 5:1 to about 1000:1; about 6:1 to about 1000:1; about 7:1 to about 1000:1; about 8:1 to about 1000:1; about 9:1 to about 1000:1; about 10:1 to about 1000:1; about 100:1 to about 1000:1; about 200:1 to about 1000:1; about 300:1 to about 1000:1; about 400:1 to about 1000:1; about 500:1 to about 1000:1; about 600:1 to about 1000:1; about 700:1 to about 1000:1; about 800:1 to about 1000:1; about 900:1 to about 1000:1; any value or combination of values within the foregoing ranges, or any sub-range within the foregoing ranges.

In a further aspect, the individual structure 10 can be characterized by an aspect ratio that is a ratio of a length dimension 40 to a cross-sectional geometry dimension 41 such that the aspect ratio has a value of about 0.1:1 to about 750:1; about 0.2:1 to about 750:1; about 0.3:1 to about 750:1; about 0.4:1 to about 750:1; about 0.5:1 to about 750:1; about 0.6:1 to about 750:1; about 0.7:1 to about 750:1; about 0.8:1 to about 750:1; about 0.9:1 to about 750:1; about 1:1 to about 750:1; 1.1:1 to about 750:1; about 1.2:1 to about 750:1; about 1.3:1 to about 750:1; about 1.4:1 to about 750:1; about 1.5:1 to about 750:1; about 1.6:1 to about 750:1; about 1.7:1 to about 750:1; about 1.8:1 to about 750:1; about 1.9:1 to about 750:1; about 2:1 to about 750:1; about 3:1 to about 750:1; about 4:1 to about 750:1; about 5:1 to about 750:1; about 6:1 to about 750:1; about 7:1 to about 750:1; about 8:1 to about 750:1; about 9:1 to about 750:1; about 10:1 to about 750:1; about 100:1 to about 750:1; about 200:1 to about 750:1; about 300:1 to about 750:1; about 400:1 to about 750:1; about 500:1 to about 750:1; about 600:1 to about 750:1; about 700:1 to about 750:1; any value or combination of values within the foregoing ranges, or any sub-range within the foregoing ranges.

In a further aspect, the individual structure 10 can be characterized by an aspect ratio that is a ratio of a length dimension 40 to a cross-sectional geometry dimension 41 such that the aspect ratio has a value of about 0.1:1 to about 500:1; about 0.2:1 to about 500:1; about 0.3:1 to about 500:1; about 0.4:1 to about 500:1; about 0.5:1 to about 500:1; about 0.6:1 to about 500:1; about 0.7:1 to about 500:1; about 0.8:1 to about 500:1; about 0.9:1 to about 500:1; about 1:1 to about 500:1; 1.1:1 to about 500:1; about 1.2:1 to about 500:1; about 1.3:1 to about 500:1; about 1.4:1 to about 500:1; about 1.5:1 to about 500:1; about 1.6:1 to about 500:1; about 1.7:1 to about 500:1; about 1.8:1 to about 500:1; about 1.9:1 to about 500:1; about 2:1 to about 500:1; about 3:1 to about 500:1; about 4:1 to about 500:1; about 5:1 to about 500:1; about 6:1 to about 500:1; about 7:1 to about 500:1; about 8:1 to about 500:1; about 9:1 to about 500:1; about 10:1 to about 500:1; about 100:1 to about 500:1; about 200:1 to about 500:1; about 300:1 to about 500:1; about 400:1 to about 500:1; any value or combination of values within the foregoing ranges, or any sub-range within the foregoing ranges.

Referring still to FIGS. 11 and 12, in an aspect, the article 1 may comprise two or more layers such that each layer comprises a plurality of structures 20 comprising individual structures 10, each individual structure 10 may extend generally in a first direction 12. In a further aspect, the layers comprising the plurality of structures 20 are arranged on an optional substrate 30 as shown schematically in FIGS. 11 and 12.

In various aspects, the substrate 30 has a thickness of about 100 µm to about 5000 µm, or any combination of values within the foregoing range. In a further aspect, the substrate 30 has a thickness of about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1000 µm, about 1050 µm, 1100 µm, about 1150 µm, about 1200 µm, about 1250 µm, about 1300 µm, about 1350 µm, about 1400 µm, about 1450 µm, about 1500 µm, about 1550 µm, about 1600 µm, about 1650 µm, about 1700 µm, about 1750 µm, about 1800 µm, about 1850 µm, about 1900 µm, about 1950 µm, about 2000 µm, about 2050 µm, 2100 µm, about 2150 µm, about 2200 µm, about 2250 µm, about 2300 µm, about 2350 µm, about 2400 µm, about 2450 µm, about 2500 µm, about 2550 µm, about 2600 µm, about 2650 µm, about 2700 µm, about 2750 µm, about 2800 µm, about 2850 µm, about 2900 µm, about 2950 µm, about 3000 µm, about 3050 µm, 3100 µm, about 3150 µm, about 3200 µm, about 3250 µm, about 3300 µm, about 3350 µm, about 3400 µm, about 3450 µm, about 3500 µm, about 3550 µm, about 3600 µm, about 3650 µm, about 3700 µm, about 3750 µm, about 3800 µm, about 3850 µm, about 3900 µm, about 3950 µm, about 4000 µm, about 4050 µm, 4100 µm, about 4150 µm, about 4200 µm, about 4250 µm, about 4300 µm, about 4350 µm, about 4400 µm, about 4450 µm, about 4500 µm, about 4550 µm, about 4600 µm, about 4650 µm, about 4700 µm, about 4750 µm, about 4800 µm, about 4850 µm, about 4900 µm, about 4950 µm, about 5000 µm, any combination of the foregoing values, or any range utilizing the foregoing values as an lower and upper bound for the range. In a still further aspect, the substrate 30 is isotropic in the gigahertz and/or terahertz spectral range. In a yet further aspect, the substrate 30 comprises a polymer. In a yet further aspect, the substrate 30 comprises a polyacrylate polymer, or copolymer thereof. The substrate 30 comprises a polymer can comprise a polymer such as one of those disclosed by Saiki, et al. in U.S. Pat. No. 4,789,620, and such polymers are incorporated herein by referenced.

In an aspect, the substrate 30 comprises a polymer comprising methacrylate, 1,6-hexanediol diacrylate (HDDA), poly(ethylene glycol) diacrylate (PEGDA), poly(ethylene glycol) dimethacrylate, 1,4-butanediol diacrylate, 1,4-dutanediol dimethacrylate, 1,6-hexamethylene glycol diacrylate, 1,6-hexamethylene glycol dimethacrylate, neopentyl glycol diacrylate, neopentyl glycol dimethacrylate, trimethylolpropane triacrylate, trimethylolpropane trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, triethylene glycol diacrylate, triethylene glycol dimethacrylate, urethane acrylate, or urethane methacrylate.

In an aspect, the substrate 30 comprises a copolymer comprising methacrylate, 1,6-hexanediol diacrylate (HDDA), poly(ethylene glycol) diacrylate (PEGDA), poly(ethylene glycol) dimethacrylate, 1,4-butanediol diacrylate, 1,4-dutanediol dimethacrylate, 1,6-hexamethylene glycol diacrylate, 1,6-hexamethylene glycol dimethacrylate, neopentyl glycol diacrylate, neopentyl glycol dimethacrylate, trimethylolpropane triacrylate, trimethylolpropane trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, triethylene glycol diacrylate, triethylene glycol dimethacrylate, urethane acrylate, or urethane methacrylate.

In various aspects, one or more of the individual structures 10, comprises a polymer that is optically transparent in the gigahertz and/or terahertz spectral range. In a further aspect, one or more of the individual structures 10 comprises a photosensitive polymer. In a still further aspect, one or more of the individual structures 10 comprise a polyacrylate polymer, or copolymer thereof. In an aspect, one or more of the individual structures 10 comprises a polymer disclosed by Saiki, et al. in U.S. Pat. No. 4,789,620, and such polymers are incorporated herein by referenced, or a copolymer thereof.

In various aspects, the individual structures 10 comprise any dielectric material. In an aspect, one or more of the individual structures 10 comprises a polymer comprising methacrylate, 1,6-hexanediol diacrylate (HDDA), poly(ethylene glycol) diacrylate (PEGDA), poly(ethylene glycol) dimethacrylate, 1,4-butanediol diacrylate, 1,4-dutanediol dimethacrylate, 1,6-hexamethylene glycol diacrylate, 1,6-hexamethylene glycol dimethacrylate, neopentyl glycol diacrylate, neopentyl glycol dimethacrylate, trimethylolpropane triacrylate, trimethylolpropane trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, triethylene glycol diacrylate, triethylene glycol dimethacrylate, urethane acrylate, or urethane methacrylate.

In an aspect, one or more of the individual structures 10 comprise a copolymer comprising methacrylate, 1,6-hexanediol diacrylate (HDDA), poly(ethylene glycol) diacrylate (PEGDA), poly(ethylene glycol) dimethacrylate, 1,4-butanediol diacrylate, 1,4-dutanediol dimethacrylate, 1,6-hexamethylene glycol diacrylate, 1,6-hexamethylene glycol dimethacrylate, neopentyl glycol diacrylate, neopentyl glycol dimethacrylate, trimethylolpropane triacrylate, trimethylolpropane trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, triethylene glycol diacrylate, triethylene glycol dimethacrylate, urethane acrylate, or urethane methacrylate.

Referring to FIG. 12, each of the individual structures 10 within the plurality of structures 20 may have a particular angular orientation within the article 1. In various aspects, the angular orientation of the individual structures 10 may be predetermined to provide an article 1 having a desired degree of anisotropy. For example, the article 1 may extend in an x-axis, a y-axis and a z-axis, as shown in FIG. 12, and each individual structure 10 may extend generally in a first direction 12. In a further aspect, the individual structures 10 within the plurality of structures 20 may have a first slanting angle as measured between the first direction 12 of the individual structure 10 and the z-axis of the article 1 or substrate 30 normal angle. In an aspect, the individual structures 10 may have a first slanting angle of about 1° to about 180°, about 1° to about 90°, about 1° to about 89°, about 1° to about 80°, about 1° to about 75°, about 1° to about 70°, about 1° to about 65°, about 1° to about 60°, about 1° to about 45°, about 1° to about 30°, any combination of the foregoing values, or any range utilizing the foregoing values as an lower and upper bound for the range. In a further aspect, the individual structures 10 within the plurality of structures 20 have a first slanting angle of about 5° to about 580°, about 5° to about 90°, about 5° to about 89°, about 5° to about 80°, about 5° to about 75°, about 5° to about 70°, about 5° to about 65°, about 5° to about 60°, about 5° to about 45°, about 5° to about 30°, any combination of the foregoing values, or any range utilizing the foregoing values as an lower and upper bound for the range. In a further aspect, the individual structures 10 within the plurality of structures 20 have a first slanting angle of about 1°, about 2.5°, about 5°, about 10°, about 15°, about 20°, about 25°, about 30°, about 35°, about 40°, about 45°, about 50°, about 55°, about 60°, about 65°, about 70°, about 75°, about 80°, about 85°, about 89°, about 90°, any combination of the foregoing values, or any range utilizing the foregoing values as an lower and upper bound for the range.

Referring still to FIG. 12, in a further aspect, the individual structures 10 within the plurality of structures 20 may have a second slanting angle as measured between the first direction 12 of the individual structure 10 and the y-axis of the article 1. In an aspect, the individual structures 10 may have a second slanting angle of about 1° to about 180°, about 1° to about 90°, about 1° to about 89°, about 1° to about 80°, about 1° to about 75°, about 1° to about 70°, about 1° to about 65°, about 1° to about 60°, about 1° to about 45°, about 1° to about 30°, any combination of the foregoing values, or any range utilizing the foregoing values as an lower and upper bound for the range. In a further aspect, the individual structures 10 within the plurality of structures 20 have a second slanting angle of about 5° to about 580°, about 5° to about 90°, about 5° to about 89°, about 5° to about 80°, about 5° to about 75°, about 5° to about 70°, about 5° to about 65°, about 5° to about 60°, about 5° to about 45°, about 5° to about 30°, any combination of the foregoing values, or any range utilizing the foregoing values as an lower and upper bound for the range. In a further aspect, the individual structures 10 within the plurality of structures 20 have a second slanting angle of about 1°, about 2.5°, about 5°, about 10°, about 15°, about 20°, about 25°, about 30°, about 35°, about 40°, about 45°, about 50°, about 55°, about 60°, about 65°, about 70°, about 75°, about 80°, about 85°, about 89°, about 90°, any combination of the foregoing values, or any range utilizing the foregoing values as an lower and upper bound for the range.

In an aspect, the individual structures 10 within the plurality of structures 20 have a length, e.g., measured along the first direction 12, of about 100 μm to about 3000 μm, or any combination of values within the foregoing range. In an aspect, the individual structures 10 within the plurality of structures 20 have a length of about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1000 μm, about 1050 μm, 1100 μm, about 1150 μm, about 1200 μm, about 1250 μm, about 1300 μm, about 1350 μm, about 1400 μm, about 1450 μm, about 1500 μm, about 1550 μm, about 1600 μm, about 1650 μm, about 1700 μm, about 1750 μm, about 1800 μm, about 1850 μm, about 1900 μm, about 1950 μm, about 2000 μm, about 2050 μm, 2100 μm, about 2150 μm, about 2200 μm, about 2250 μm, about 2300 μm, about 2350 μm, about 2400 μm, about 2450 μm, about 2500 μm, about 2550 μm, about 2600 μm, about 2650 μm, about 2700 μm, about 2750 μm, about 2800 μm, about 2850 μm, about 2900 μm, about 2950 μm, about 3000 μm, any combination of the foregoing values, or any range utilizing the foregoing values as an lower and upper bound for the range.

In an aspect, the individual structures 10 within the plurality of structures 20 have an ellipsoid, a circular, a trigonal, a square, a rectangular, a pentagonal, or a hexagonal cross-sectional geometry. In a further aspect, the individual structures 10 within the plurality of structures 20 have a cross-sectional geometry of a regular geometric figure of 3-12 sides. In a still aspect, the individual structures 10 within the plurality of structures 20 have an ellipsoid or a circular cross-sectional geometry. As discussed herein above, the cross-sectional geometry is associated with a cross-sectional geometry dimension 41 that is the cross-sectional geometry dimension of an individual structure 10. As shown in FIG. 11, the cross-sectional geometry is circular, and accordingly the longest cross-sectional geometry dimension is the diameter thereof. Alternatively, the cross-sectional geometry could be an ellipse, and in such an instance, the cross-sectional geometry dimension would be a length of a major axis of such an ellipse shape. Further aspects of the cross-sectional geometry are disclosed herein below. In various aspects, the cross-sectional geometry can be any regular or irregular geometry or shape.

In an aspect, the individual structures 10 within the plurality of structures 20 have a cross-sectional geometry with a length in the longest dimension of said geometry of about 1 μm to about 1000 μm, or any combination of values within the foregoing range. In a further aspect, the individual structures 10 within the plurality of structures 20 have a cross-sectional geometry with a length in the longest dimension of said geometry of about 10 μm to about 1000 μm. In a still further aspect, the individual structures 10 within the plurality of structures 20 have a cross-sectional geometry with a length in the longest dimension of said geometry of about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 105 μm, 110 μm, about 115 μm, about 120 μm, about 125 μm, about 130 μm, about 135 μm, about 140 μm, about 145 μm, about 150 μm, about 155 μm, about 160 μm, about 165 μm, about 170 μm, about 175 μm, about 180 μm, about 185 μm, about 190 μm, about 195 μm, about 200 μm, about 205 μm, 210 μm, about 215 μm, about 220 μm, about 225 μm, about 230 μm, about 235 μm, about 240 μm, about 245 μm, about 250 μm, about 255 μm, about 260 μm, about 265 μm, about 270 μm, about 275 μm, about 280 μm, about 285 μm, about 290 μm, about 295 μm, about 300 μm, about 305 μm, 310 μm, about 315 μm, about 320 μm, about 325 μm, about 330 μm, about 335 μm, about 340

μm, about 345 μm, about 350 μm, about 355 μm, about 360 μm, about 365 μm, about 370 μm, about 375 μm, about 380 μm, about 385 μm, about 390 μm, about 395 μm, about 400 μm, about 405 μm, 410 μm, about 415 μm, about 420 μm, about 425 μm, about 430 μm, about 435 μm, about 440 μm, about 445 μm, about 450 μm, about 455 μm, about 460 μm, about 465 μm, about 470 μm, about 475 μm, about 480 μm, about 485 μm, about 490 μm, about 495 μm, about 500 μm, about 505 μm, 510 μm, about 515 μm, about 520 μm, about 525 μm, about 530 μm, about 535 μm, about 540 μm, about 545 μm, about 550 μm, about 555 μm, about 560 μm, about 565 μm, about 570 μm, about 575 μm, about 580 μm, about 585 μm, about 590 μm, about 595 μm, about 600 μm, about 605 μm, 610 μm, about 615 μm, about 620 μm, about 625 μm, about 630 μm, about 635 μm, about 640 μm, about 645 μm, about 650 μm, about 655 μm, about 660 μm, about 665 μm, about 670 μm, about 675 μm, about 680 μm, about 685 μm, about 690 μm, about 695 μm, about 700 μm, about 705 μm, 710 μm, about 715 μm, about 720 μm, about 725 μm, about 730 μm, about 735 μm, about 740 μm, about 745 μm, about 750 μm, about 755 μm, about 760 μm, about 765 μm, about 770 μm, about 775 μm, about 780 μm, about 785 μm, about 790 μm, about 795 μm, about 800 μm, about 805 μm, 810 μm, about 815 μm, about 820 μm, about 825 μm, about 830 μm, about 835 μm, about 840 μm, about 845 μm, about 850 μm, about 855 μm, about 860 μm, about 865 μm, about 870 μm, about 875 μm, about 880 μm, about 885 μm, about 890 μm, about 895 μm, about 900 μm, about 905 μm, 910 μm, about 915 μm, about 920 μm, about 925 μm, about 930 μm, about 935 μm, about 940 μm, about 945 μm, about 950 μm, about 955 μm, about 960 μm, about 965 μm, about 970 μm, about 975 μm, about 980 μm, about 985 μm, about 990 μm, about 995 μm, about 1000 μm, any combination of the foregoing values, or any range utilizing the foregoing values as an lower and upper bound for the range.

In various aspects, the individual structures 10 may be spatially arranged within the plurality of structures 20 so as to form a geometric pattern. In an aspect, the individual structures 10 may be spatially arranged so that a cross-section of the plurality of structures 20 substantially resembles a zig-zag, a stair case, a circular configuration. One of skill in the art would understand the various configurations of spatial arrangements that could be employed, in view with the teachings herein.

Referring to FIG. 11, in various aspects, the plurality of structures 20 is arranged such that there is a certain spacing (or gaps) between adjacent individual structures 10. In a further aspect, the spacing within the plurality of structures 20 is such that each of the individual structures 10 are separated from the nearest individual structure by 10-100 μm, or any combination of values within this range. In a still further aspect, the spacing within the plurality of structures 20 is such that each of the individual structures 10 are separated from the nearest individual structure by 25-75 μm. In a still further aspect, the spacing within the plurality of structures 20 is such that each of the individual structures 10 are separated from the nearest individual structure by about 0.5 μm, about 1 μm, about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, any combination of the foregoing values, or any range utilizing the foregoing values as an lower and upper bound for the range.

In various aspects, the article 1 has a thickness, as measured along the z-axis or substrate normal axis. In various aspects, the length and angle of the individual structures 10 in the plurality of structures 20 are such that thickness of the layer comprising same is about 100 μm to about 3000 μm in z-axis or substrate normal axis. In a further aspect, the length and angle of the individual structures 10 in the plurality of structures 20 are such that thickness of the layer comprising same is about 100 μm to about 2000 μm in z-axis or substrate normal axis, or any combination of values within this range. In a still further aspect, the length and angle of the individual structures 10 in the plurality of structures 20 are such that thickness of the layer comprising same is about 100 μm to about 1000 μm in z-axis or substrate normal axis. In a yet further aspect, the length and angle of the individual structures 10 in the plurality of structures 20 are such that thickness of the layer comprising same is about 100 μm to about 750 μm in z-axis or substrate normal axis. In an even further aspect, the length and angle of the individual structures 10 in the plurality of structures 20 are such that thickness of the layer comprising same is about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1000 μm, about 1050 μm, 1100 μm, about 1150 μm, about 1200 μm, about 1250 μm, about 1300 μm, about 1350 μm, about 1400 μm, about 1450 μm, about 1500 μm, about 1550 μm, about 1600 μm, about 1650 μm, about 1700 μm, about 1750 μm, about 1800 μm, about 1850 μm, about 1900 μm, about 1950 μm, about 2000 μm, any combination of the foregoing values, or any range utilizing the foregoing values as an lower and upper bound for the range.

In an aspect, the disclosed article comprises slanted columnar layers fabricated using stereolithography from methacrylates for the terahertz-frequency domain. In a further aspect, the slanted columnar layers are composed of spatially coherent wires with a diameter of about 100 μm to about 500 μm, a length of about 100 μm to about 1000 μm, and a first slanting angle of about 15° to about 75°, i.e., the angle with respect to the surface normal of the substrate. In a further aspect, the slanted columnar layers are composed of spatially coherent wires with a diameter of about 100 μm, a length of about 700 μm, and a first slanting angle of about 45°, i.e., the angle with respect to the surface normal of the substrate.

In various aspects, the disclosed article exhibits anisotropic optical dielectric functions. In a further aspect, the anisotropic optical dielectrical functions are characterized using spectroscopic ellipsometry. Exemplary ellipsometry methods include those described in U.S. Pat. Nos. 8,426,408, 8,705,032, 9,041,927, the respective disclosures of which are incorporated herein by reference in their entirety to the extent they are consistent with the present disclosure.

In an aspect, the present disclosure pertains to enhancement of optical anisotropy in the gigahertz and terahertz spectral range by specific geometries and spatial configurations designed into the disclosed articles, such as a 3D metamaterial. For example, enhancement of optical anisotropy can be enhanced via geometrical configuration effects such as when the optical path length (n*l, where n is the index of refraction and l is the length through the material with the index n) in a single element or multiple elements of the structure is a multiple of the wavelength. In this aspect, the optical anisotropy is dramatically enhanced in narrow frequency bands. In various aspects, the effect can be found if either the layer exhibiting the form-birefringence or the substrate on which the birefringent layer is placed on or both layers have an optical thickness (n*d, where d is the layer thickness) which is a multiple of the wavelength at the given angle of incidence and therefore path through the layered material. In a still further aspect, a geometrical enhancement effect can be achieved by constructing an air cavity located in a plane parallel to the birefringent layer. The dimensions of the cavity must be an exact multiple of the wavelength.

In an aspect, present disclosure pertains to methods of making the disclosed articles, such as a 3D metamaterial, comprising spatially coherent dielectric structures. In a further aspect, the disclosed articles, such as a 3D metamaterial, can be prepared using 3D printing techniques with a spatial resolution smaller than the diffraction limit at a given wavelength. In a still further aspect, the disclosed articles, such as a 3D metamaterial, can be prepared using maskless stereolithography techniques. Stereolithography broadly encompasses a variety of a 3D printing techniques, in particular, such techniques that can achieve spatial resolutions on the order of several tens of micrometers. As described herein below, a spatial resolution in the tens of micrometers can produce a spatially dependent optical response in reflection. In a still further aspect, the disclosed articles, such as a 3D metamaterial, can be prepared by other maskless photolithographic techniques such as 3D two photon lithography techniques. In a yet further aspect, the disclosed articles, such as a 3D metamaterial, are prepared using 3D two photon lithography with a spatial resolution of about 100 nm.

Before proceeding to the Examples, it is to be understood that this disclosure is not limited to particular aspects described, and as such may, of course, vary. Other systems, methods, features, and advantages of compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Examples

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

The anisotropic optical properties of a disclosed 3D metamaterial composed of slanted columnar structures fabricated from methacrylates by stereolithography is further disclosed. Terahertz generalized spectroscopic ellipsometry which has been demonstrated as a versatile technique for the characterization of anisotropic sculptured thin films (T. Hofmann, C. M. Herzinger, A. Boosalis, T. E. Tiwald, J. A. Woollam, and M. Schubert, Rev. Sci. Instrum. 81, 023101 (2010); T. Hofmann, D. Schmidt, A. Boosalis, P. Kühne, R. Skomski, C. M., Herzinger, J. A. Woollam, M. Schubert, and E. Schubert, Appl. Phys. Lett. 99, 081903 (2011); P. Kühne, C. M. Herzinger, M. Schubert, J. A. Woollam, and T. Hofmann, Rev. Sci. Instrum. 85, 071301 (2014); and T. Hofmann, S. Knight, D. Sekora, D. Schmidt, C. Herzinger, J. Woollam, E. Schubert, and M. Schubert, Appl. Surf. Sci. http://dx.doi.org/10.1016/j.apsusc.2016.12.200 (2016)) is used here to accurately measure the THz optical response of these structures. A simple homogenization approach is found to be sufficiently accurate to describe the complex THz optical behavior of the investigated structures which exhibit biaxial (orthorhombic) optical properties.

Generalized spectroscopic ellipsometry measurements were carried out in the spectral range from 201 to 350 GHz with a resolution of 2.5 GHz. A commercial frequency-domain THz ellipsometer (THz-VASE instrument available from J. A. Woollam, Co., Inc., Lincoln, Nebr.) operating in a polarizer-sample-rotating compensator-analyzer configuration was used for the measurements disclosed here. This instrument is capable of measuring 11 out of the 16 real-valued Mueller matrix elements Mij connect the Stokes parameters before and after sample interaction (H. Fujiwara, Spectroscopic Ellipsometry (John Wiley & Sons, New York, 2007)). Only the elements in the 4th column are inaccessible for this instrument due to the lack of a source side compensator (P. Hauge, Surf. Sci. 96, 108 (1980)). Note that the Mij values disclosed here are normalized with respect to M11.

Experimental THz-GSE data sets were obtained from the isotropic reference substrate at two angles of incidence $\varphi_a$=50° and 70° and analyzed in combination with standard spectroscopic ellipsometry data obtained in the infrared spectral range from 6 to 100 THz (200 to 3300 cm-1) using a commercial infrared ellipsometer (IR-VASE instrument available from J. A. Woollam, Co., Inc.) in order to determine the dielectric function of bulk-like methacrylate. The slanted columnar sample was investigated using THz-GSE at two different angles of incidence φ=50° and 70° and three different in-plane sample orientations φ. For the recorded in-plane orientations φ=0°, 45° and 90° the columnar slanting plane was oriented parallel, oblique (45°), and perpendicular to the plane of incidence, respectively.

All obtained experimental ellipsometric data sets were analyzed using stratified layer model calculations where nonlinear least square methods are used to vary significant physical model parameters until all model calculated data sets were matched simultaneously to the experimental THz-GSE data sets (best-model; see G. E. Jellison, Thin Solid Films 313-314, 33 (1998)). Parameterized model dielectric functions are used here to render the THz optical response of the sample constituents. A homogeneous biaxial layer approach was employed to describe the optical response of the slanted columnar layer. This homogenization approach was first demonstrated in the visible spectral range for thin films composed of non-absorbing slanted columnar structures which can consequently be considered as an effective medium with biaxial properties (I. J. Hodgkinson and Q. H. Wu, Birefringent Thin Films and Polarizing Elements (World Scientific, Singapore, 1998); and D. Schmidt, B. Booso, T. Hofmann, E. Schubert, A. Sarangan, and M. Schubert, Opt. Lett. 34, 992 (2009)). The effective dielectric function tensor was described by the three major components along $\varepsilon_a$, $\varepsilon_b$, and $\varepsilon_c$ along the major axes $\vec{a}$, $\vec{b}$, and $\vec{c}$ of an orthorhombic system which is aligned with the slanted columnar geometry: $\vec{a}$ was oriented perpendicular to the slanting plane and $\vec{b}$ and $\vec{c}$ were oriented perpendicular and parallel to the wire axis, respectively.

3D metamaterial samples were fabricated using a commercially available stereolithography system (Form 2 instrument available from Formlabs, Inc., Somerville, Mass.). The 3D metamaterial sample comprised a slanted columnar methacrylate layer deposited on top of a homogeneous methacrylate substrate. All samples were fabricated in a single fabrication step. Following the photopolymerization the sample was rinsed and subsequently sonicated in isopropyl alcohol for 10 minutes to remove un-polymerized access material.

The control sample—an isotropic control—a bare, homogeneous methacrylate substrate with a nominal thickness of 3 mm and was used as a reference sample to determine the terahertz dielectric properties of bulk methacrylate without a 3D metamaterial arranged thereon.

For the data described in FIGS. 1-5, the data were obtained using a 3D metamaterial sample comprising slanted wires with a diameter of 200 µm, a length of approximately 1400 µm, and a slanting angle of 45° with respect to the substrate surface normal. See FIG. 12 for depiction of angles: e describes the slanting angle (also referred to as a first slanting angle) that describes angle between an individual structural element from the z-axis or substrate surface normal; φ describes the sample azimuth for the spectroscopic ellipsometry measurement; and $\phi_a$ describes the angle of incidence for the spectroscopic ellipsometry measurement.

For the data shown in FIGS. 6-10, the data were obtained using a 3D metamaterial sample comprising a 500 µm thick slanted columnar methacrylate layer deposited on top of a homogeneous methacrylate substrate with a nominal thickness of 1 mm. The slanted columnar layer was composed of wires with a length of approximately 700 µm. The diameter and spacing of the wires was 100 µm and 150 µm, respectively. The slanting angle of the wires was 45° with respect to the substrate surface normal.

FIG. 1 shows the experimental (dotted lines) and model calculated (solid lines) block off-diagonal Mueller matrix elements ($M_{13}$, $M_{31}$, $M_{23}$, and $M_{32}$) measured for a 3D metamaterial sample comprising a 3D metamaterial deposited on an isotropic substrate (left) in comparison to an isotropic control (right). The data show a strong optical anisotropy is observed in the terahertz spectral range for the 3D metamaterial sample. All measurements shown in FIG. 1 were obtained at an angle of incidence of 60°. In contrast the response of the bulk methacrylate-based substrate is isotropic (compare the left and right panels). This observation verifies that a metamaterial sample prepared in accordance with the present disclosure comprising 3D arrangements of subwavelength structures of methacrylates exhibit anisotropic optical responses. It should be noted in FIG. 1 that the small contribution to the block-off diagonal elements for the bulk sample in FIG. 1 is likely due to a non-intentional sample tilt during the measurement. That is, a slight tilting of the isotropic control of 1.25° resulted in a non-intentional shift of the block-off diagonal elements.

Figure 2:
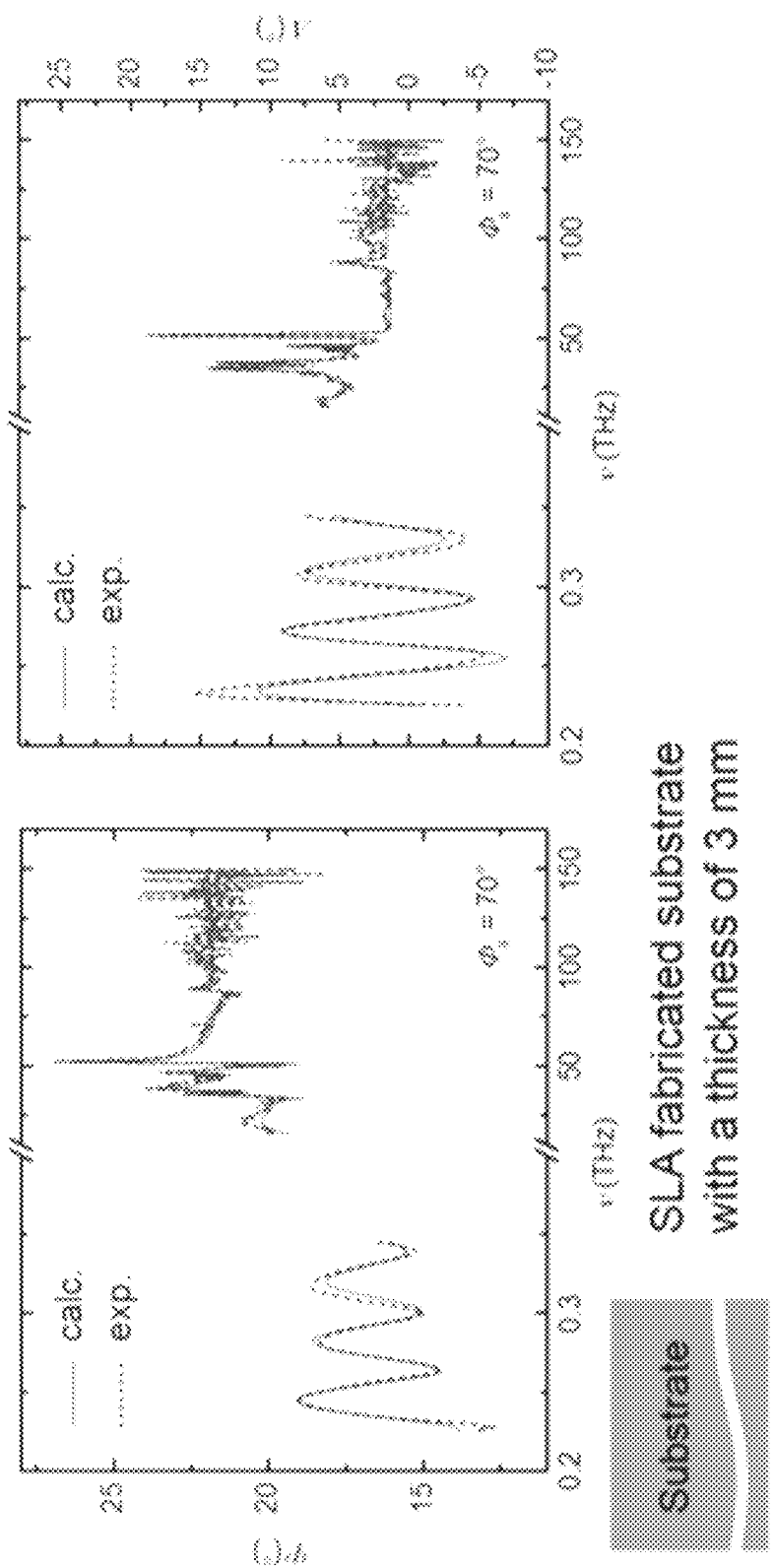
FIG. 2 shows representative spectroscopic ellipsometric data of a representative material of the present disclosure showing a terahertz transparent response.

FIG. 2 shows data for the isotropic control described above. Briefly, FIG. 2 shows the experimental (dotted lines) and model calculated (solid lines) ellipsometric angles Ψ and Δ of a bulk-like methacrylate-based reference sample over a wide spectral range from 0.2 to 150 terahertz. The sample was prepared by photopolymerization as described herein. The spectral range from 0.2 to 0.35 terahertz is dominated by Fabry-Pèrot oscillations in the substrate, i.e., the methacrylates are transparent in this spectral range and the interfaces sufficiently smooth and plane parallel. The range from 10 to 150 terahertz exhibits strong resonances which are due to the absorptions.

Figure 3:
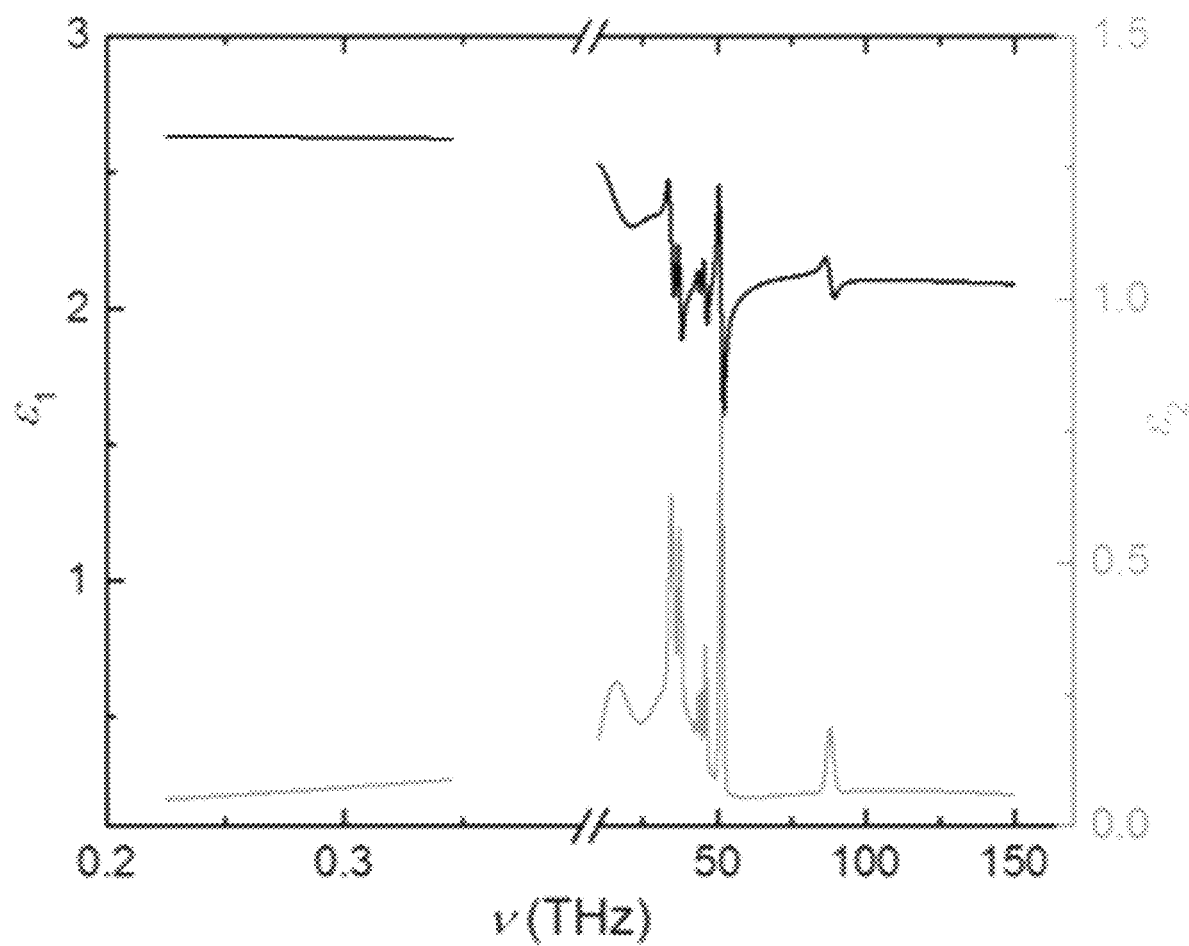
FIG. 3 shows representative real ($\varepsilon_1$) and imaginary ($\varepsilon_2$) portions of the complex isotropic dielectric function of a disclosed article in the terahertz and infrared spectral range.

FIG. 3 shows data for the dielectric response over the spectral range from 0.2 to 150 THz. Briefly, FIG. 3 shows the real ($\varepsilon_1$) and imaginary ($\varepsilon_2$) part of the complex dielectric function of a methacrylate-based substrate in the spectral range from 0.2 to 150 THz. The spectral range from 10 to 150 terahertz exhibits strong resonances which are due to the infrared-active absorptions. The spectral range from 0.2 to 0.35 terahertz on the other hand shows very little dispersion and is almost transparent.

Figure 4:
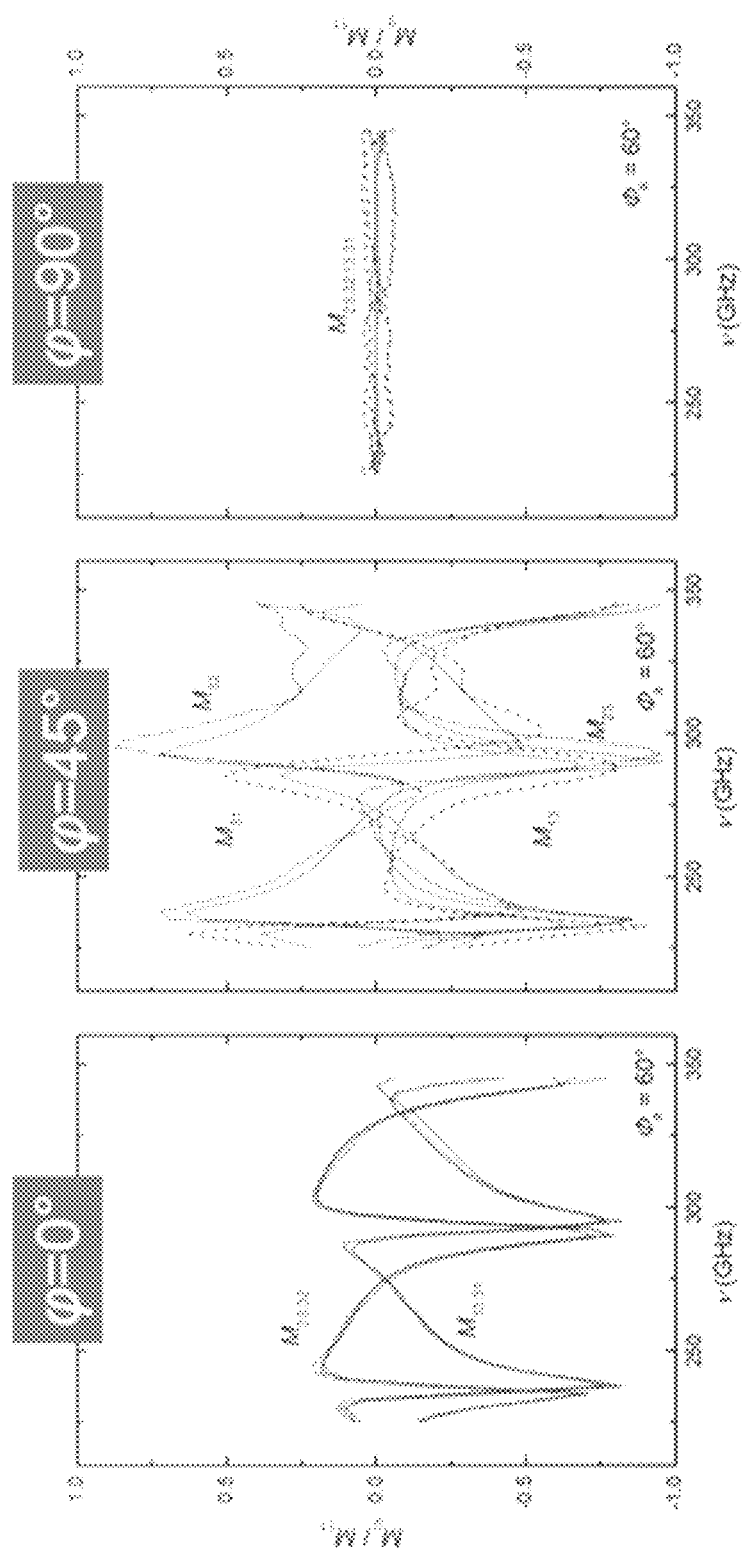
FIG. 4 shows representative experimental data compared to model calculated results for block-off diagonal Mueller matrix elements for a disclosed representative material.

FIG. 4 shows experimental (dotted lines) and model calculated (solid lines) block-off diagonal Mueller matrix elements ($M_{13}$, $M_{31}$, $M_{23}$, and $M_{32}$) measured for a sample composed of a 3D metamaterial deposited on an isotropic substrate (prepared as described herein) for three sample azimuth angles φ. Further sample details are described in the caption of FIG. 1. All measurements where obtained at an angle of incidence of 60°. As indicated, the panels in FIG. 4, left to right, show the optical response for different sample azimuth orientations φ=0°, 45°, and 90°, respectively For the φ=0° the plane of incidence is perpendicular to the slanting plane of the wires which are the constituents of the 3D metamaterial. Both measurements for φ=0° and 45° show a strong anisotropic optical response, whereas the Mueller matrix data for φ=90° where the plane of incidence is parallel to the slanting plane is virtually isotropic.

Figure 5:
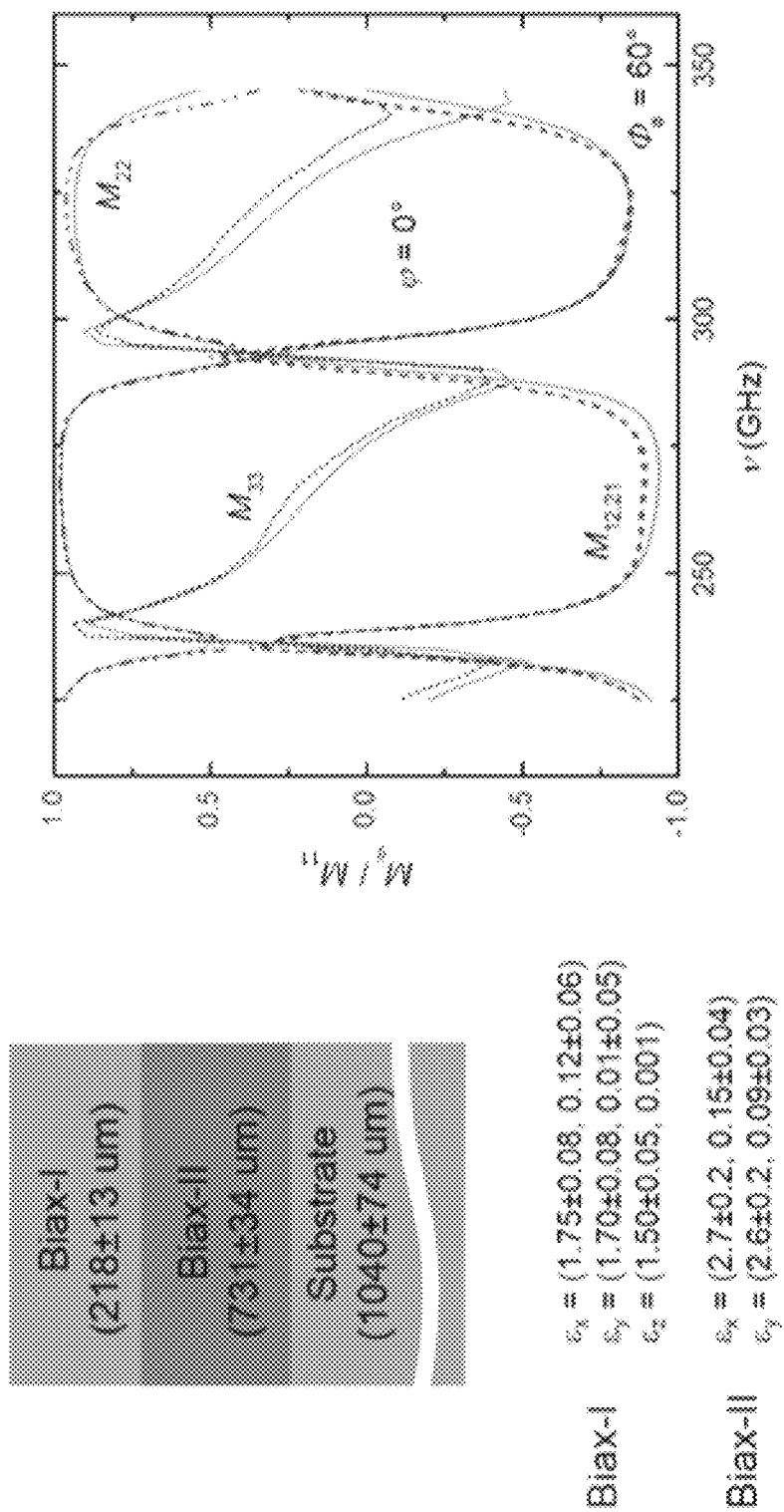
FIG. 5 shows representative experimental data compared to model calculated results for block-on diagonal Mueller matrix elements for a disclosed representative material.

FIG. 5 shows the optical model used for the analysis of the THz Mueller matrix data. Briefly, FIG. 5 shows optical model and experimental (dotted lines) and model calculated (solid lines) block on-diagonal Mueller matrix elements ($M_{12}$, $M_{21}$, and $M_{33}$) for a 3D metamaterial sample deposited on an isotropic substrate as described above. The sample azimuth for the measurement was φ=0° and the angle of incidence was 60°. Although, the substrate was modeled using the dielectric function shown in FIG. 3, the 3D metamaterial was modeled using two biaxial layers. This homogenization approach leads to layers with a thickness of 218±13 µm and 731±34 µm, respectively. In combination with the substrate thickness which was determined to be 1040±74 µm, the total sample thickness was estimated to be 1989 µm. These values are in excellent agreement to the nominal thickness of 2000 µm. The real and imaginary part of the dielectric tensor for those two layers is given in FIG. 5. Note that the dispersion has been neglected in these calculations and the ε along the mayor polarizability directions was assumed to be a frequency-independent constant. The right panel in FIG. 5 shows the experimental (dotted lines) and model calculated (solid lines) block on-diagonal Mueller matrix elements ($M_{12}$, $M_{21}$, and $M_{33}$) for a sample azimuth of φ=0°.

It should be noted that the dielectric constants for the bottom biaxial layer are significantly larger than those of the first. Without wishing to be bound by a particular theory, it is believed that this can be attributed to resin trapped in the spaces between the polymerized methacrylate wires during the fabrication which can result in an almost isotropic response with values for comparable to those found for the isotropic control sample. The top biaxial layer on the other hand is substantially different with a significantly larger birefringence and values much lower than those of the isotropic control as expected from the volume fraction of the wires.

Figure 6:
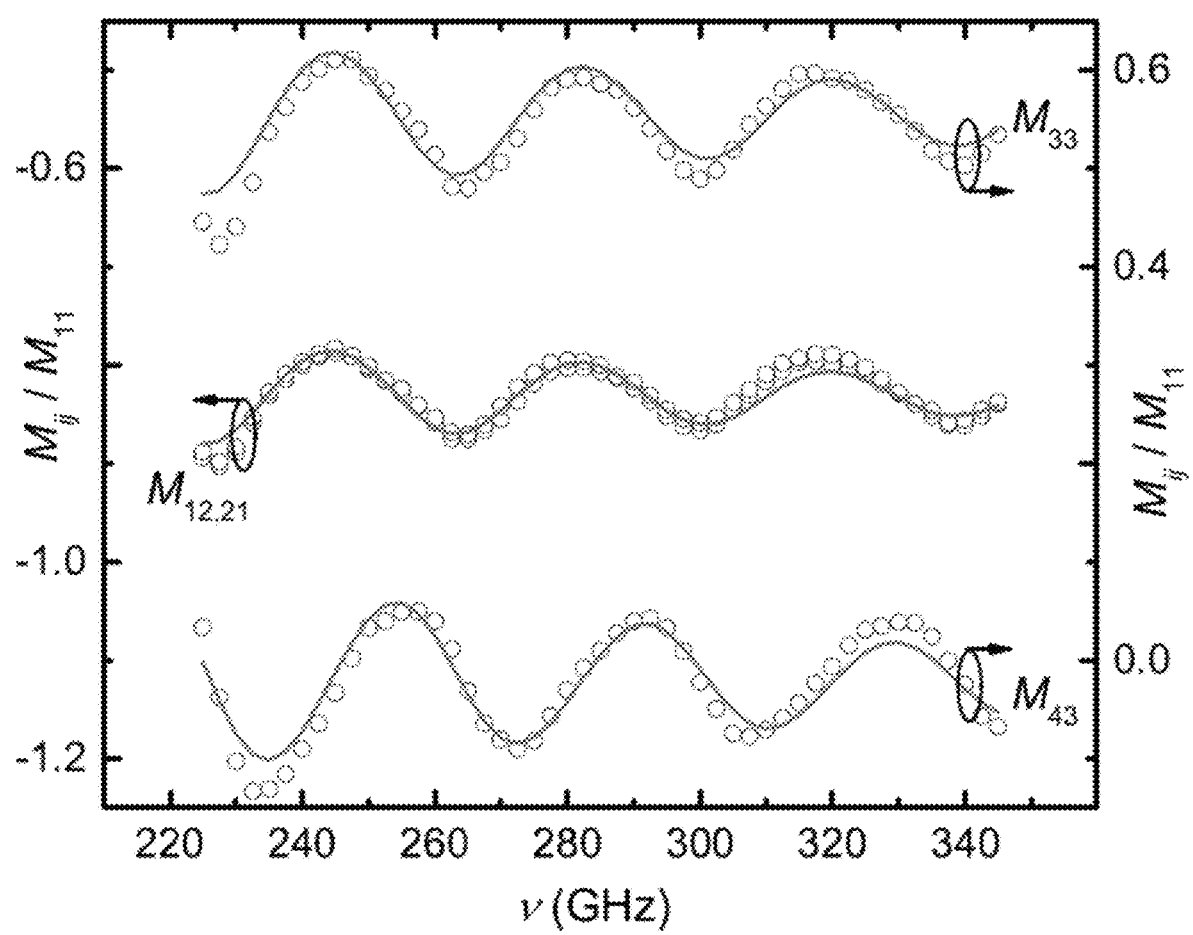
FIG. 6 shows representative experimental (symbols) and best-model calculated (solid lines) Mueller matrix spectra of an isotropic reference substrate.
Figure 7:
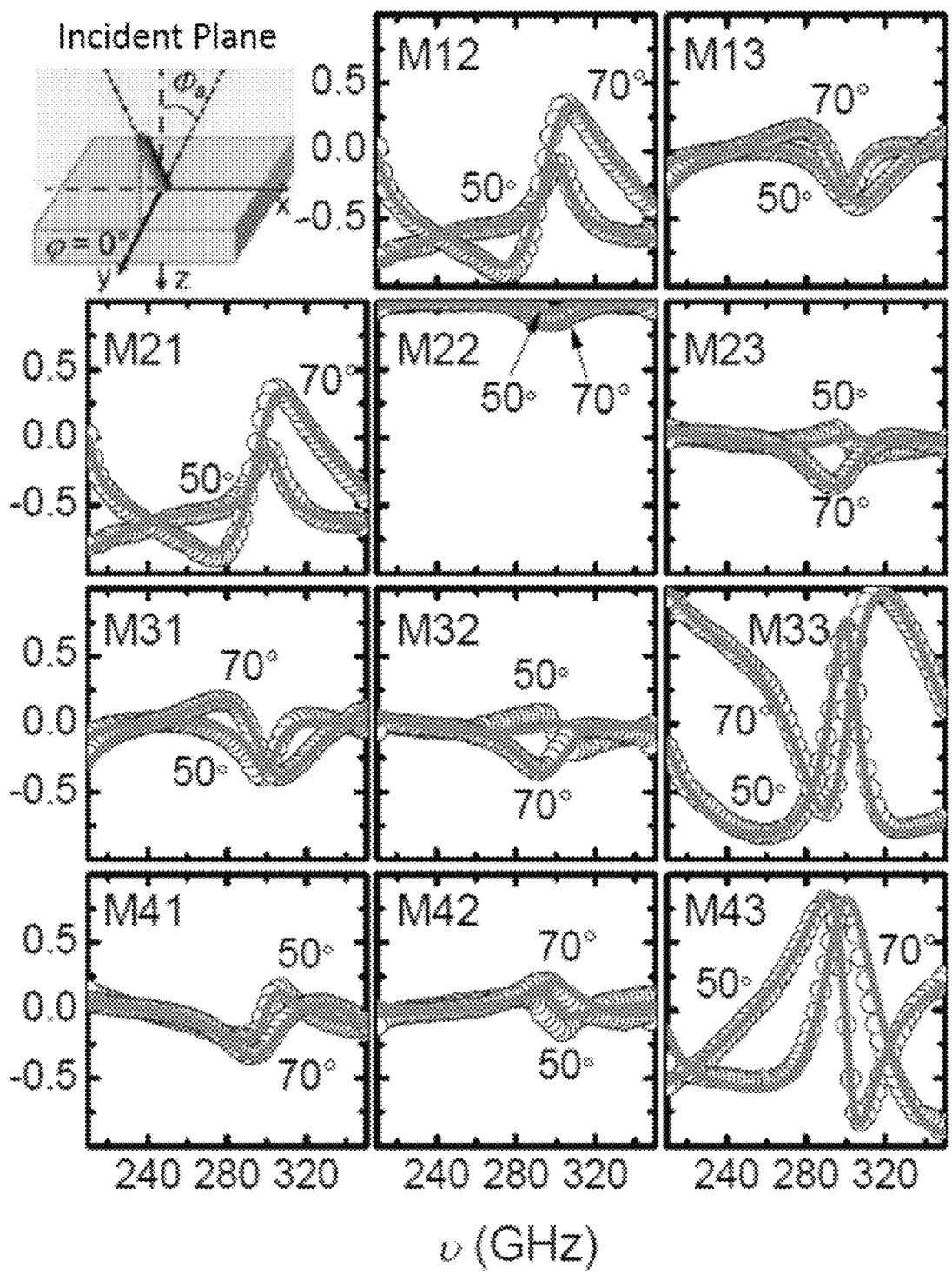
FIG. 7 shows representative experimental (symbols) and best-model calculated (solid lines) Mueller matrix spectra of a representative material for three different in-plane orientations, $\varphi=0°$ and two angles of incidence $\varphi_a=50°$ and 70°. The inset illustrates orientation of the slanting plane with respect to the plane of incidence.
Figure 10A:
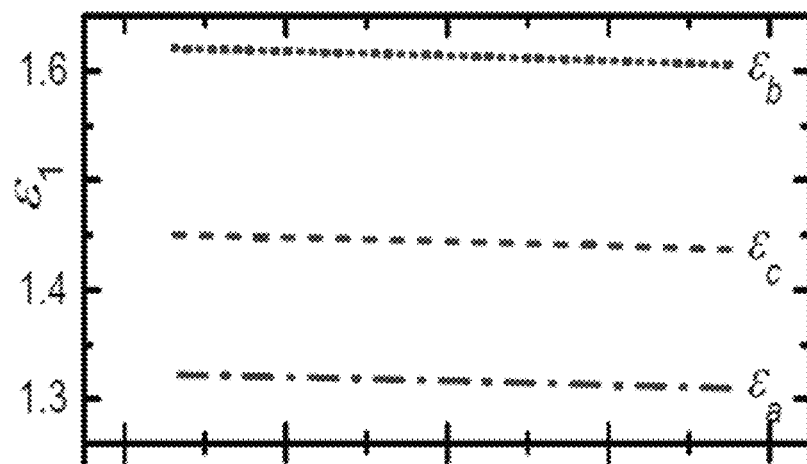
FIGS. 10A-10C show representative data pertaining to the real and imaginary part of the biaxial (orthorhombic, see inset in FIG. 10C) dielectric function $\varepsilon_a$, $\varepsilon_b$, $\varepsilon_c$ obtained from the best-model calculation for the methacrylate slanted columnar layer are shown in FIG. 10A and FIG. 10B, respectively. The isotropic dielectric function for the bulk-like methacrylate obtained from the reference substrate is shown for comparison in FIG. 10C.
Figure 10B:
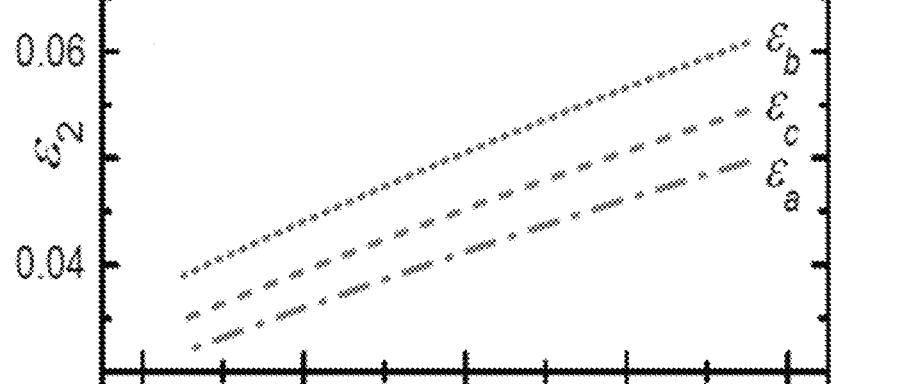
Figure 10C:
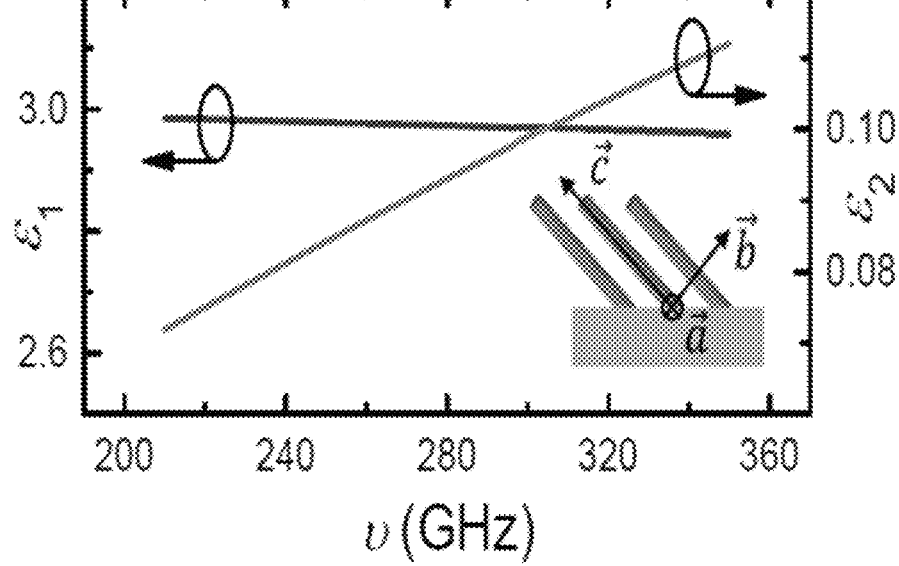

FIGS. 6 and 7 show experimental and best-model calculated Mueller matrix data obtained for the homogeneous reference substrate and the slanted columnar sample, respectively. Best-model calculated and experimental data were in good agreement for both samples. For the homogeneous reference substrate only the non-trivial Mueller matrix data are shown at an angle of incidence of $\varphi_a=70°$ for clarity. The Mueller matrix spectra showed a distinct Fabry-Perot interference pattern caused by the transparent substrate with a thickness of $d=(2.91\pm2)$ mm. A gradual dampening of the oscillation amplitude was shown with increasing frequency which can be attributed to a broad, optically active vibrational mode with a resonance energy outside of the investigated spectral range. The recorded off-diagonal block Mueller matrix elements ($M_{13}$, $M_{23}$, $M_{31}$, $M_{32}$, $M_{41}$, and $M_{42}$; not shown) were all within a range of $\pm0.03$ as would be expected for an isotropic sample response. FIG. 10 depicts the best-model dielectric function of bulk-like methacrylate showing slight absorption and very little dispersion consistent with THz measurements of other polymers (M. Naftaly and R. E. Miles, Proc. IEEE 95, 1658 (2007)).

FIG. 7 shows the experimental and best-model calculated THz Mueller matrix data for three different in-plane rotations $\varphi=0°$, 45°, and 90° at two angles of incidence $\phi_a=50°$ and 70° in panels a), b), and c), respectively. The spectra were dominated by a sharp resonance at approximately 290 GHz due to a Fabry-Perot interference originating from the substrate and the slanted columnar layer. The position of the Fabry-Perot resonance was determined by the thickness of the substrate and the slanted columnar and varies with $\phi_a$. The highly anisotropic nature of the THz optical response caused by the form-induced birefringence in the slanted columnar layer sample was evident in the non-zero off-diagonal block elements ($M_{13}$, $M_{23}$, $M_{31}$, $M_{32}$, $M_{41}$, and $M_{42}$) for $j=0°$ and 45°. For $\varphi=90°$ where the plane of incidence parallel to the slanting plane the off-diagonal block elements are vanishing. The largest values for $M_{31,31}$ and $M_{32,23}$ are on the order of $\pm0.5$ while $M_{41}$ and $M_{42}$ are slightly smaller. With the Mueller matrix values being defined between 1 and −1 the slanted columnar layer exhibited a strongly anisotropic THz response.

Figure 8:
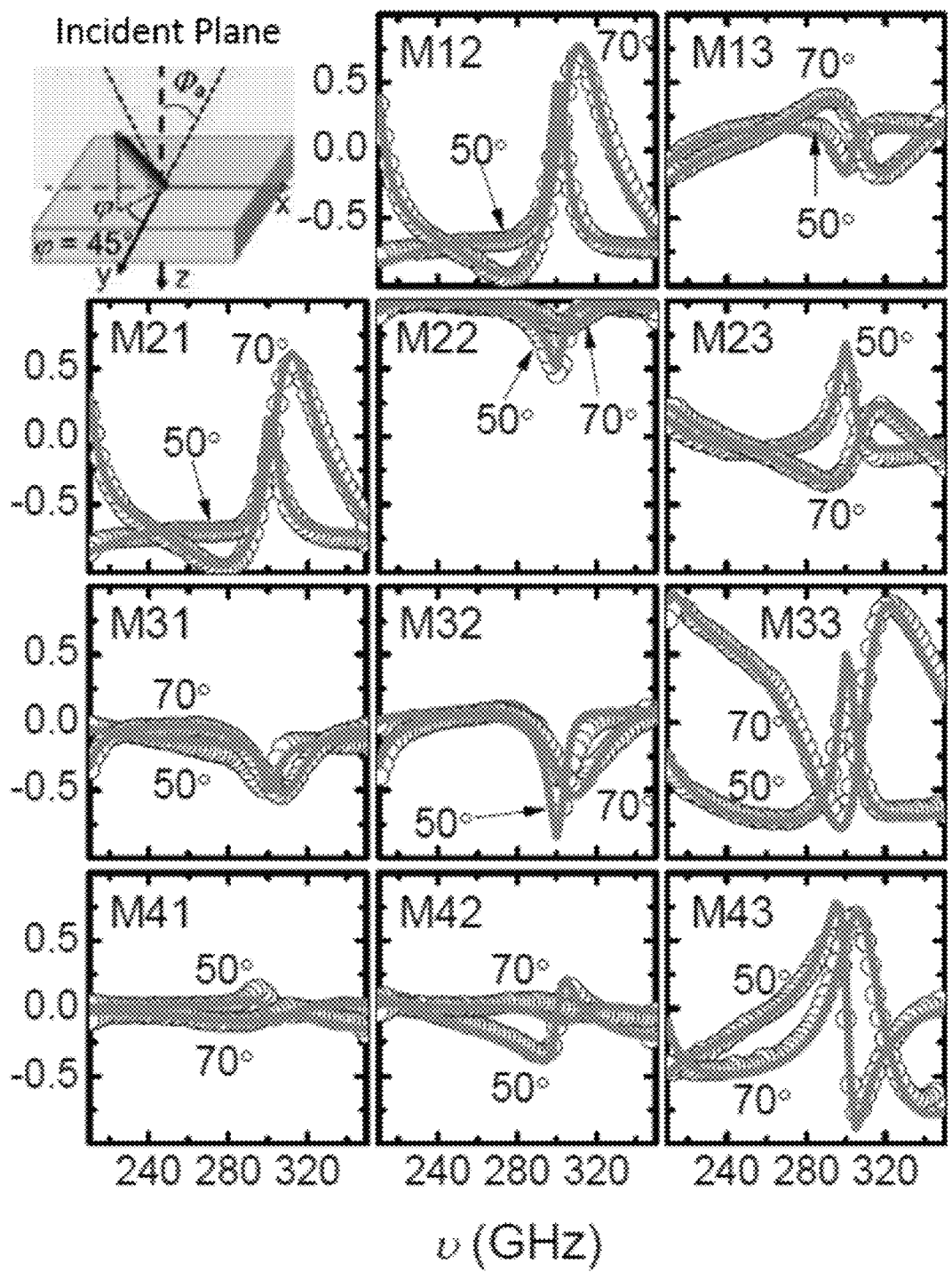
FIG. 8 shows representative experimental (symbols) and best-model calculated (solid lines) Mueller matrix spectra of a representative material for three different in-plane orientations, $\varphi=45°$ and two angles of incidence $\varphi_a=50°$ and 70°. The inset illustrates orientation of the slanting plane with respect to the plane of incidence.
Figure 9:
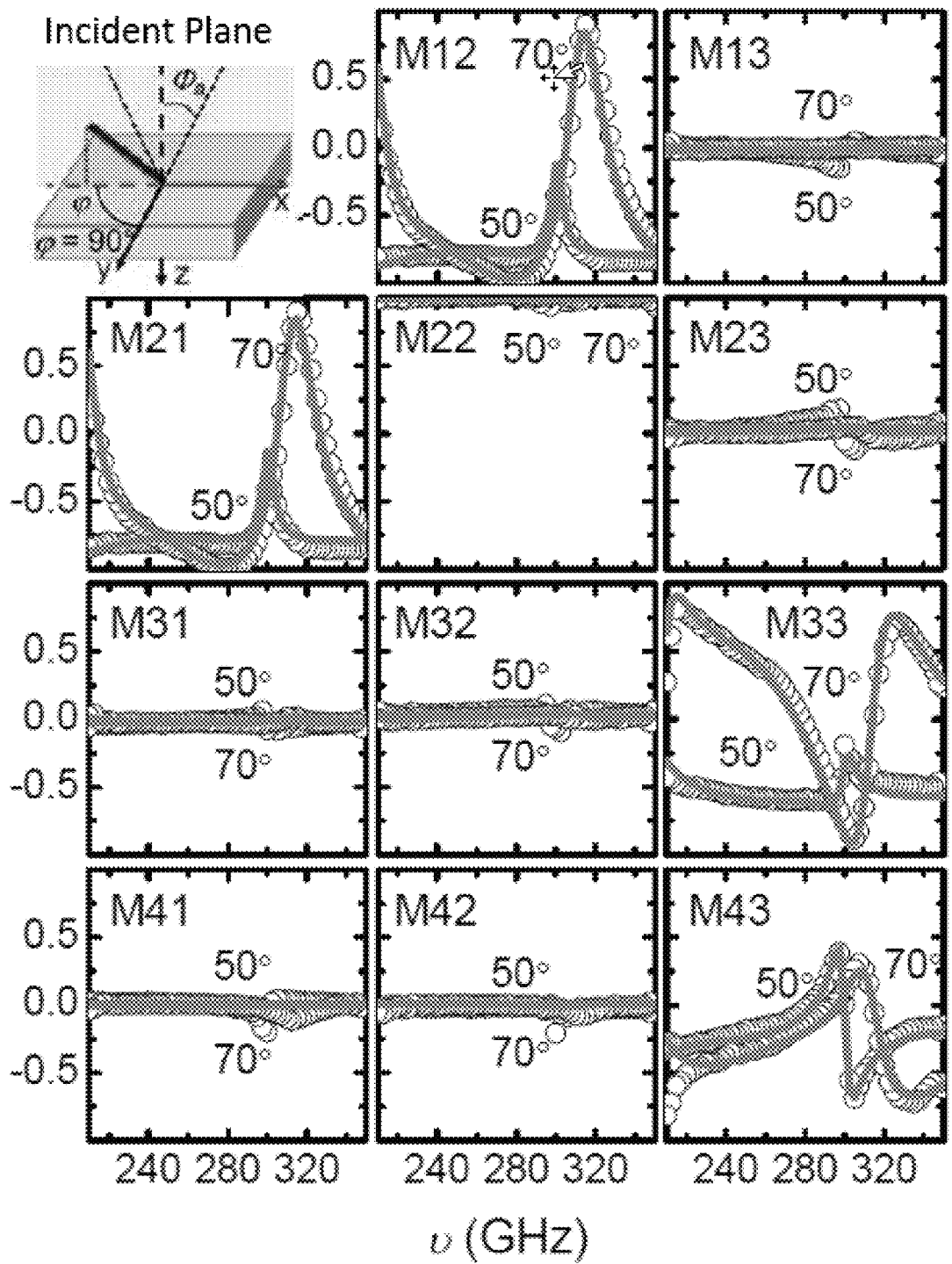
FIG. 9 shows representative experimental (symbols) and best-model calculated (solid lines) Mueller matrix spectra of a representative material for three different in-plane orientations, $\varphi=90°$ and two angles of incidence $\phi_a=50°$ and 70°. The inset illustrates orientation of the slanting plane with respect to the plane of incidence.

The real and imaginary part of the dielectric function of the slanted columnar layer along the major polarizability directions $\vec{a}$, $\vec{b}$, and $\vec{c}$ is shown in FIGS. 8 and 9, respectively. For comparison the isotropic dielectric function of the bulk-like methacrylate obtained from the homogeneous reference samples also shown (FIG. 10). The data show that the optical properties of the slanted columnar layer exhibit a strong birefringent and as well as dichroic behavior over the entire THz spectral range investigated here. It is noted that the permittivity perpendicular with the wire direction ($\varepsilon^c$) is the largest. The difference between the polarizability directions is approximately 25%. The dichroism is small and follows the same trend as the birefringence.

The disclosed example shows stereolithography for the fabrication of THz metamaterials. In a particular example, a simple structure composed of slanted methacrylate wires with a diameter of 100 μm and a length of approximately 700 μm was used to demonstrate the influence of form-induced birefringence on the bulk-like optical properties of methacrylate. The THz generalized ellipsometry experiments indicated a strongly anisotropic optical response of slanted columnar layer structure while the bulk-like response was found to be isotropic. Moreover, the example discloses a simple homogenization approach which renders the optical properties as orthorhombic. A strong birefringence as well as dichroism was observed. In various aspects, mask-less 3D photopolymerization can be used for the fabrication of THz metamaterials providing a method such that polarizability and anisotropy are easily tailored and virtually arbitrary architectures are attainable.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. An article comprising a plurality of individual structures,
    wherein the article has a y-axis, an x-axis, and a z-axis,
    wherein each individual structure comprises a polymer optically transparent in the gigahertz and/or terahertz spectral range, and has an elongation axis,
    wherein each individual structure has an aspect ratio of a length in the longest dimension along the elongation axis to the longest dimension of the cross-sectional geometry of about 0.1:1 to about 3000:1;
    wherein the plurality of structures is slanted relative to the x-axis and has a first slanting angle of about 1° to 89° and a second slanting angle of about 1° to 89°;
    wherein the first slanting angle θ is an angle between the elongation axis of each individual structure of plurality of the structures and the z-axis;
    wherein the second slanting angle φ is an angle between the elongation axis of each individual structure of plurality of the structures and the y-axis;
    wherein the x-axis, the y-axis, and the z-axis are perpendicular to one another;
    and
    wherein the polymer is a polyacrylate.

2. The article of claim 1, wherein the polyacrylate is a photosensitive polymer.

3. The article of claim 1, wherein the polyacrylate is methacrylate, 1,6-hexanediol diacrylate, poly(ethylene glycol) diacrylate, or poly(ethylene glycol) dimethacrylate.

4. The article of claim 1, wherein the plurality of structures is arranged on a substrate material, and wherein the substrate material is co-planar with the x-axis and the y-axis.

5. The article of claim 4, wherein the substrate material comprises a polyacrylate.

6. The article of claim 1, wherein the structure has a cross-sectional geometry dimension of about 1 μm to about 1000 μm.

7. The article of claim 1, wherein the structure has a length dimension of about 100 μm to about 3000 μm.

8. The article of claim 1, wherein the article exhibits form-induced birefringence or optical anisotropy.

9. A device comprising the article of claim 1.

10. An article comprising a layer having a plurality of spatially coherent individual columnar structures, wherein the article has a y-axis, an x-axis, and a z-axis;
    wherein the plurality of spatially coherent individual columnar structures comprises individual columnar structures each individual columnar structure comprises a polymer optically transparent in the gigahertz and/or terahertz spectral range, and has an elongation axis, wherein each individual columnar structure has an aspect ratio of a length in the longest dimension along the elongation axis to the longest dimension of the cross-sectional geometry of about 0.1:1 to about 3000:1, and wherein each of the individual columnar structures has a cross-sectional geometry that is irregular shape, ellipsoid, circular, or a regular geometric figure having 5-12 sides; a first slanting angle of about 1° to 89°; and a second slanting angle of about 1° to 89°; wherein the first slanting angle θ is an angle between the plurality of structures and the z-axis and the second slanting angle φ is an angle between the plurality of structures and the y-axis; wherein the y-axis and the z-axis are perpendicular to one another.

11. The article of claim 10, wherein the individual columnar structures are spatially arranged within the plurality of structures to form a geometric pattern.

12. The article of claim 10, wherein the individual columnar structures are arranged to have a gap between adjacent individual structures.

13. The article of claim 12, wherein the gap is such that each of the individual columnar structures is separated from a nearest individual structure by 10-100 μm.

14. The article of claim 10, wherein the individual columnar structures touch one another.

15. The article of claim 10, wherein the individual columnar structures are arranged on a substrate, wherein the substrate is co-planar with the x-axis and the y-axis, and the z-axis is normal to the substrate.

16. The article of claim 15, wherein the substrate is in contact with the individual columnar structures and fixes them in a desired arrangement to one another.

17. The article of claim 15, wherein the substrate has a thickness of about 100 μm to about 5000 μm.

18. The article of claim 10, wherein each of the individual columnar structures has a cross-sectional geometry that is circular.

\* \* \* \* \*